(12) United States Patent
Allen et al.

(10) Patent No.: US 10,887,748 B2
(45) Date of Patent: Jan. 5, 2021

(54) MYSHAKE: SMARTPHONE-BASED EARTHQUAKE EARLY WARNING SYSTEM

(71) Applicant: THE REGENTS OF THE UNIVERSITY OF CALIFORNIA, Oakland, CA (US)

(72) Inventors: Richard Allen, Orinda, CA (US); Qingkai Kong, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 317 days.

(21) Appl. No.: 15/974,466

(22) Filed: May 8, 2018

(65) Prior Publication Data

US 2018/0376314 A1    Dec. 27, 2018

Related U.S. Application Data

(63) Continuation of application No. PCT/US2016/061383, filed on Nov. 10, 2016.

(60) Provisional application No. 62/254,162, filed on Nov. 11, 2015.

(51) Int. Cl.
*G01V 1/00* (2006.01)
*G01V 1/28* (2006.01)
(Continued)

(52) U.S. Cl.
CPC .............. *H04W 4/90* (2018.02); *G01V 1/008* (2013.01); *G01V 1/288* (2013.01); *G06Q 50/26* (2013.01); *G08B 21/10* (2013.01)

(58) Field of Classification Search
CPC ........ G01V 1/008; G01V 1/288; G06Q 50/26; G08B 21/10; H04W 4/90

USPC ............. 702/14, 15; 340/540, 690; 370/238; 455/404.1, 404.2
See application file for complete search history.

(56) References Cited

U.S. PATENT DOCUMENTS

| 2013/0328688 | A1  | 12/2013 | Price |
|---|---|---|---|
| 2015/0195693 | A1  | 7/2015 | Hooriani |
| 2016/0197837 | A1* | 7/2016 | Fullerton .............. H04L 65/602 370/238 |

FOREIGN PATENT DOCUMENTS

| JP | 2010239476 A1 | 10/2010 |
|---|---|---|
| KR | 1020130041687 A | 4/2013 |
| KR | 1020140042087 A | 4/2014 |

OTHER PUBLICATIONS

Korean Intellectual Property Office (KIPO), International Search Report and Written Opinion dated Jan. 31, 2017, related PCT international application No. PCT/US2016/061383, pp. 1-14, claims searched, pp. 15-19.

(Continued)

*Primary Examiner* — John H Le
(74) *Attorney, Agent, or Firm* — O'Banion & Ritchey LLP; John P. O'Banion

(57) ABSTRACT

A distributed seismic system, "MyShake", which collectively harnesses sensor data from smartphones to determine earthquake onset, and generate warnings through the self-same phone network. The system can record magnitude 2.5 or larger earthquakes, and provides on-phone detection capability to separate earthquake shake data from other every-day shakes of the phone. The earthquake data is collected at a central site where a network detection algorithm confirms that an earthquake is underway and estimates the location and magnitude in real-time. This information is used to issue an alert of forthcoming ground shaking, such as through the network of phones for an early earthquake warning system.

15 Claims, 11 Drawing Sheets

(51) Int. Cl.
    *G01B 21/10*      (2006.01)
    *H04W 4/90*       (2018.01)
    *G06Q 50/26*      (2012.01)
    *G08B 21/10*      (2006.01)

(56) References Cited

OTHER PUBLICATIONS

University of California, Berkeley, "3rd International Conference on Earthquake Early Warning: Implementing Earthquake Alerts", Abstract Booklet, Berkeley, California, Sep. 3-5, 2004, 55 pages.
Begany, Katelyn, "Shake 'N Quake", Berkeley Science Review, http://berkeleysciencereview.com, Apr. 27, 2014, 4 pages.
Barrie, Joshua, "This New App Can Alert You If an Earthquake Is Coming", MyShake Earthquake App, Business Insider, Nov. 13, 2014, 2 pages.
Christopher, Ben, "Earthquake Alert? An app for that is on the way", California Magazine, Aug. 24, 2014, 6 pages.
Kong, Qingkai et al., Smartphone-based Networks for Earthquake Detection, I4CS 2015—Nuremberg Conference Programy IEEE, Jul. 10, 2015, 8 pages.
Hammill, Roxie et al., "A Quake Warning, Before It Strikes", The New York Times, Nov. 12, 2014, 4 pages.
Quinn, Michelle, "Where's my earthquake early-warning-app?", San Jose Mercury News, Oct. 9, 2015, 3 pages.
Witze, Alexandra, "Buying time when quakes hit—West Coast warning system could offer crucial seconds before destructive shaking begins", Science News, Apr. 19, 2014, 4 pages.

\* cited by examiner

MYSHAKE: SMARTPHONE-BASED EARTHQUAKE EARLY WARNING SYSTEM

CROSS-REFERENCE TO RELATED APPLICATIONS

This application is a 35 U.S.C. § 111(a) continuation of PCT international application number PCT/US2016/061383 filed on Nov. 10, 2016, incorporated herein by reference in its entirety, which claims priority to, and the benefit of, U.S. provisional patent application Ser. No. 62/254,162 filed on Nov. 11, 2015, incorporated herein by reference in its entirety. Priority is claimed to each of the foregoing applications.

The above-referenced PCT international application was published as PCT International Publication No. WO 2017/083556 on May 18, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to seismic early warning systems, and more particularly to an early warning system that can be hosted on cellular phones or other computer-enabled devices.

2. Background Discussion

Large magnitude earthquakes in urban environments exact a massive toll in human life, and inflict lasting societal and economic woes. The goal of earthquake early warning (EEW) is to provide from seconds to minutes of warning to allow people to move to safe zones and to perform automated slowdown and shutdowns of transit and other machinery. The small number of existing EEW systems operating around the world generally rely on traditional seismic and geodetic networks that only exist in a few nations. Thus, although these units may detect seismic activity indicative of an earthquake onset, they are only capable of detecting earthquakes in a small number of locations around the globe.

Accordingly, a need exists for a low cost EEW that is broadly available to the citizenry. The present disclosure provides an EEW alert system which overcomes the shortcomings of previous approaches.

BRIEF SUMMARY

The disclosed technology can provide earthquake detection, verification and alert generation based on detecting earthquakes underway by making use of the sensors across a distribution of smartphones. The complete end-to-end earthquake early warning system, includes detection and characterization of earthquake shaking on a smartphone, transmission of this information to a central server, network detection/confirmation of an earthquake on the server, and distribution of alerts to users via cell phone or other devices. Smartphones are much more prevalent than traditional networks and contain accelerometers that can also be used to detect earthquakes.

Earthquake early warning systems are being developed in several countries around the world using traditional seismic networks. There is wide interest from both the public and enterprise customers in using earthquake alerts. By using smartphones to detect earthquakes these early warnings can be improved in the United States (US) as well as to provide warning in a number of countries which lack seismic networks. These early warnings can be utilized so that people move from harms way, as well as to stop trains, stop elevators, move data to safe storage, instruct people to protect themselves, and so forth.

The following discloses this new type of seismic system, referred to herein as the "MyShake" system, that harnesses personal/private smartphone sensors to collect data and analyze earthquakes. In this system it is shown that smartphones can record magnitude 2.5 earthquakes at distances of a few kilometers, and describes an on-phone detection capability to separate earthquakes from other every-day shakes. Furthermore, magnitude 5 earthquakes can be detected out to about 150 km, with larger earthquakes being detectable to larger distances. Still further, it will be appreciated that as sensor technology advances, the ability of the cellular phones to detect seismic activity at further distances and/or accuracies should become common place.

The embodied system collects this earthquake data at a central site (e.g., one or more network servers or internet servers) where a network detection algorithm confirms that an earthquake is underway and estimates the location and magnitude in real-time. This information can then be used to issue an alert of forthcoming ground shaking. MyShake could be used to enhance EEW in regions with traditional seismic networks, and could provide the only EEW capability in regions without. In addition, the seismic waveforms recorded could be used to deliver rapid microseismic maps, study impacts on buildings and possibly image shallow earth structure and earthquake rupture kinematics.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction

Figure 1:
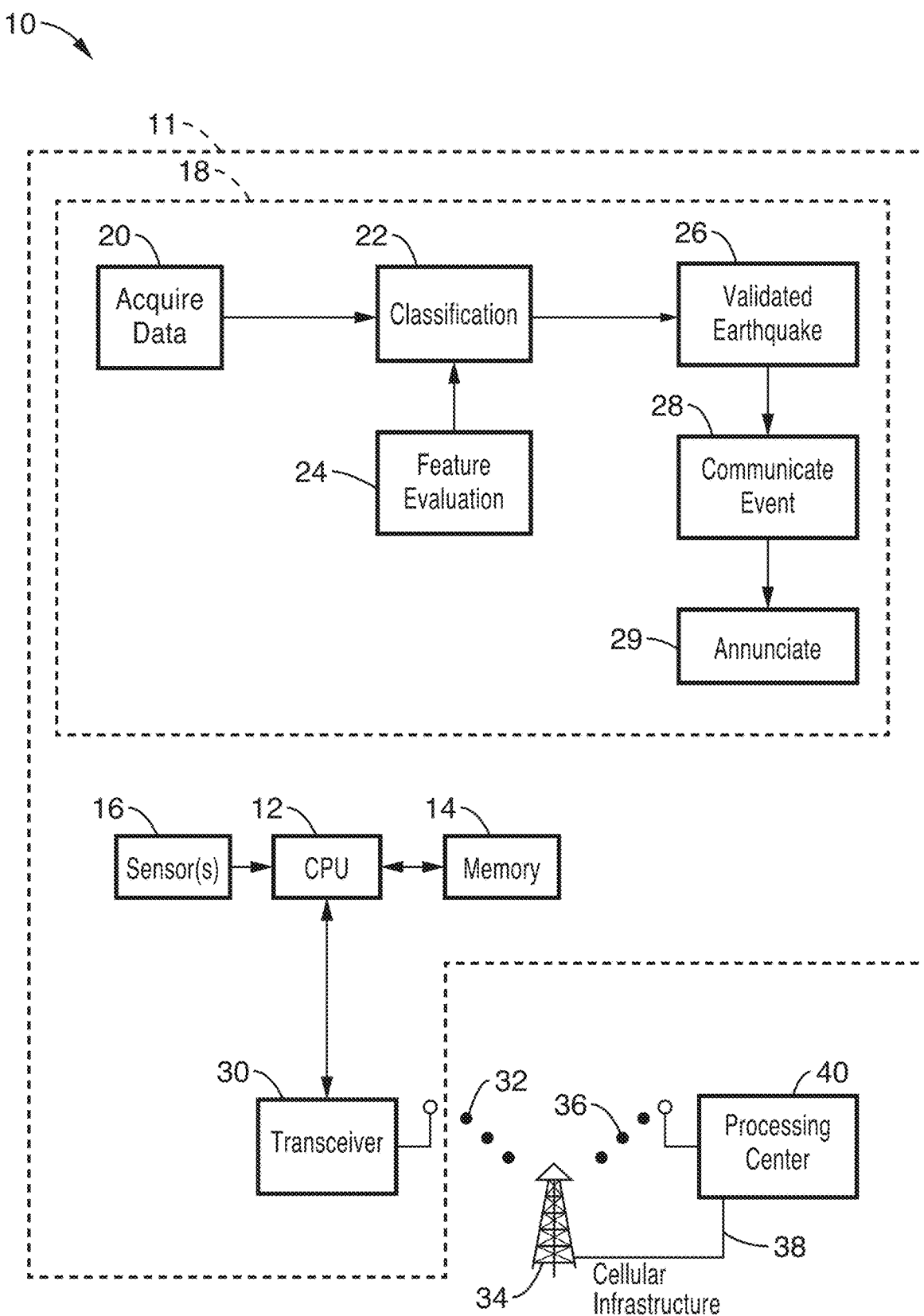
FIG. 1 is a flow diagram of a MyShake Earthquake early warning system according to an embodiment of the present disclosure.

Earthquake Early Warning (EEW) systems can detect the location and magnitude of an earthquake in a few seconds, and issue a warning to the target area before the damaging seismic waves arrive. This new technology can reduce fatalities, injuries and damage resulting from an earthquake by alerting people to take cover, slowing and stopping trains, opening elevator doors, and many other applications. The development of EEW to date has largely focused on the use of traditional seismic and geodetic networks, whose deployment is not widespread.

The present disclosure makes use of the ubiquitous nature of smartphones which are already configured with a variety of built-in sensors and communications capabilities. There were 2.6 billion smartphones worldwide in 2014, and this number is expected to pass 6 billion by 2020. In this disclosure, development of the MyShake system is described for harnessing the sensors utilized in personal smartphones to record earthquake-shaking data for research, hazard information and earthquake early warning (EEW).

The present disclosure is configured so that it may be deployed to utilize other seismology crowdsourcing projects. The Quake Catcher Network (QCN) and Community Seismic Network (CSN) primarily use low cost MEMS accelerometers that plug into computers and can be installed in buildings to detect earthquakes. These networks consist of a few hundred to a few thousand accelerometers, but are limited by the need to pass hardware from the network operators to the users. By using the acceleration sensors in smartphones, there is only a need to pass software from the network operators to users, which is relatively simple using the Google Play and iTunes store.

It will be noted that the CSN also explored the use of smartphone accelerometers. However, their approach was to ask if newly incoming data is similar to previously defined human activities. If not, it is treated as an anomaly, and these anomalies communicated to a processing center where a picking algorithm will determine if it is earthquake or not.

By contrast to the above, the MyShake system utilizes past earthquake information to develop a classifier algorithm to identify earthquake shaking on each single phone in the distribution of phones, and then communicate this information with a centralized processing center (CPC). It will be noted that the disclosed technology can also make use of GPS sensors on smartphones, either by themselves, or more preferably to augment accelerometer data, to detect earthquakes and potentially provide a warning. It will be noted that keeping a GPS circuit active for the primary sensing of an earthquake causes significant power consumption, generally limited that type of use to dedicated smartphones, and not to portable smartphones in daily use.

Another crowd-sourcing project is using twitter to detect earthquakes. A tweet-frequency time series constructed from tweets containing the word earthquake in various languages, and an algorithm is used to identify possible earthquakes. Finally, the USGS Did You Feel It (DYFI) system is a web-based approach for collecting reports of shaking and damage as experienced by individuals. The reports are converted into intensity and used to generate detailed shaking intensity maps when enough people report. The intensity estimate relies on subjective descriptions by the reporter. By using smartphone sensors, MyShake utilizes the power of crowd sourcing, while also reporting shaking time series and accurate locations.

The MyShake network builds on some initial work at UC Berkeley to determine the quality of the accelerometers in smartphones. This work was extended in the present disclosure to develop a mobile device (e.g., Android® in this example) application that runs efficiently on the users' smartphone and detects whether the movement of a phone is likely caused by an earthquake verses other motion sources, such as human activities. The system sends the information back to a processing center where a network detection algorithm confirms that an earthquake is underway. The location, origin time, and magnitude of the earthquake are then determined based on multiple triggers from the network of phones. This information can be used to estimate the shaking intensity and remaining time until damaging waves arrive at a target location. The following section details: (a) size and proximity requirements for earthquake signals to be recorded by smartphones, (b) development of the disclosed on-phone detection capability to distinguish earthquakes from other shakes, and (c) design of a network detection algorithm to operate at the processing center to confirm when an earthquake is underway, locate and characterize it. This has been achieved within the real-world constraints of building an Android application that runs in the background on personal mobile device, such as personal cellular phones without draining power.

FIG. 1 illustrates an example embodiment 10 of the MyShake system. In this example a mobile device 11 is shown with at least one computer processor 12, coupled to at least one memory 14, and to one or more sensors 16. The mobile device is connected to a network, for example a cellular phone network. A transceiver 30 is seen for communicating high probability earthquake events wirelessly 32 to a cellular infrastructure 34, from which these events are collected across a wide distribution of mobile devices in the area and communicated wirelessly 36, or via a wired communication (e.g., dedicated wired phone connectivity) 38. In either case the high probability earthquake events are received at processing station 40 for data analysis over a wide number of reporting cellular phones. If upon analyzing the data (e.g., artificial neural network and/or conventional programming) an earthquake is found to be in progress, then data can be communicated back from processing center 40 to the mobile device and/or to other sources for disseminating event information.

In the figure, the generalized steps for ascertaining an earthquake event are shown being performed by instructions executing from memory 14 on processor 12 based on input from sensors 16. Sensor data is acquired 20. The event is classified 22, preferably utilizing multiple feature evaluation 24 although other techniques may be utilized. Upon determining with high degree of accuracy that an earthquake event is likely taking place in block 26 for validating the Earthquake, then the event is communicated at block 28 to a processing center. In at least one embodiment, if the event sent to the processing center is indeed an earthquake, then a validated earthquake signal is received back from the processing center and an annunciation (e.g., audio, visual, tactile, or any combination thereof) is generated 29 to the user as an EEW.

2. Seismic Sensing Results from Smartphones

To better understand which earthquakes can be detected on smartphones, the noise floor of the accelerometers on multiple android phones were determined by placing them in a basement and allowing them to record this data for one month. The noise floor (signal noise) of the phones contains the internal noise of the phone itself plus other environmental sources in a quiet basement. Once this level is known, the necessary size of earthquakes can be determined when the ground shaking amplitude exceeds the noise.

Figure 2:
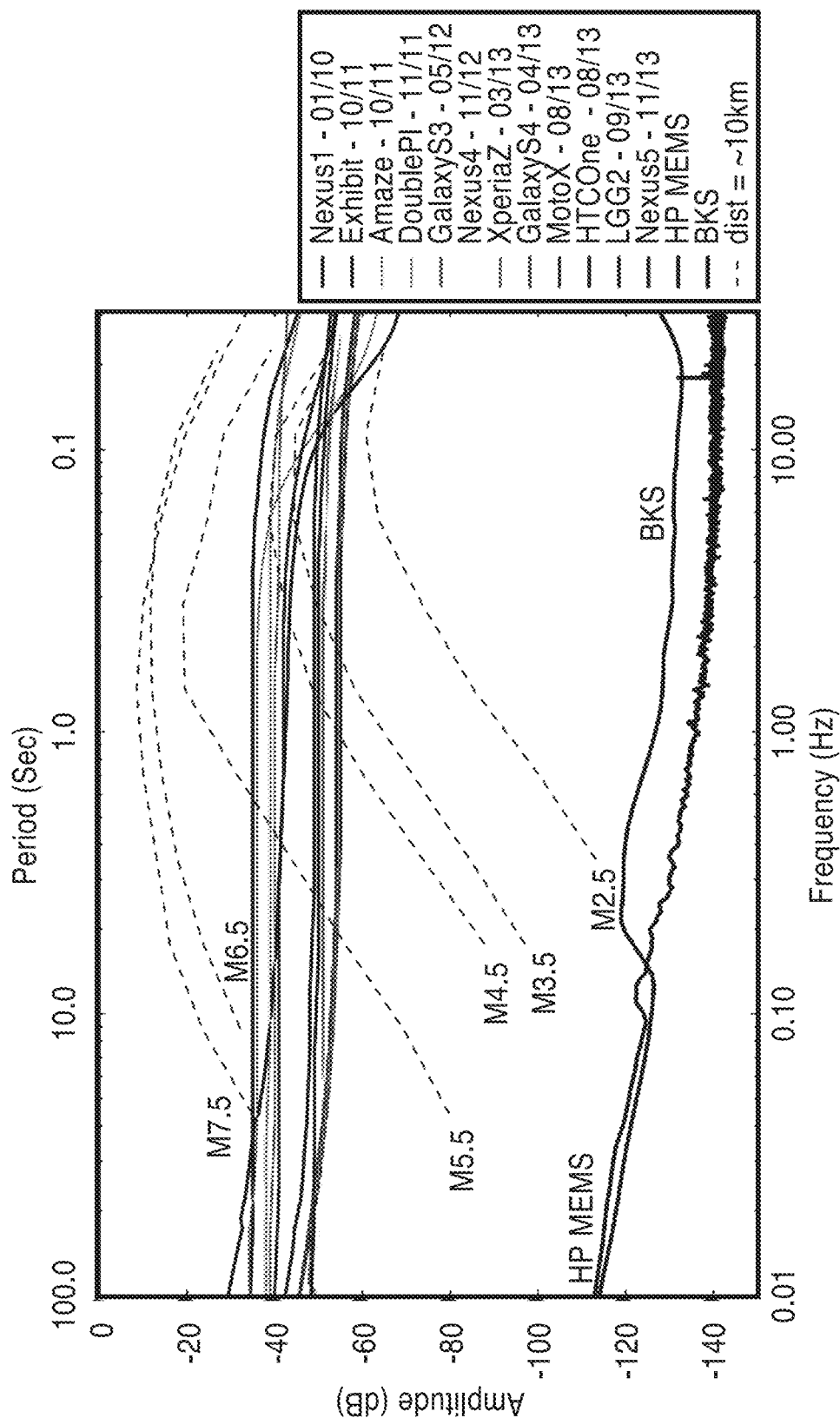
FIG. 2 is a plot of acceleration noise floor for a number of different makes of cellular phone, such as utilized according to an embodiment of the present disclosure.

FIG. 2 compares the noise floor of the test phones to the amplitude of shaking for various magnitude earthquakes at 10 km. All phones are sensitive to the shaking for M5 or larger earthquakes 10 km or less from the phone in the frequency range of 1 to 10 Hz, and they are capable of recording the longer periods of larger magnitude events. There is a gradual improvement in the sensor capabilities with the release date of the phone (see the color change from cold to warm). The more recent phone models are sensitive to shaking for M3.5 at 10 Hz. The in-phone accelerometers can record shaking for the earthquakes that do damage in the frequency range that causes most damage (1 to 10 Hz). Also, it is generally anticipated that the quality of acceleration and other sensors in phones to improve further with time. In at least one embodiment, the earthquake early warning application operating on the cell phone and/or the central server, are configured for utilizing information about the model of the cell phone for quantifying the accuracy and other parameters of its acceleration sensor. The HP MEMS accelerometer (bottom plot line on the right) was recently developed for seismic imaging applications. It is currently too expensive for inclusion in smartphones, but illustrates that MEMS sensors can have similar capabilities to more traditional strong motion sensors, and example of which is shown with station BKS, which is the lower line from the bottom left of the plot. In the figure, dashed black lines are typical ground motion amplitudes of earthquakes 10 km from the epicenter for various magnitudes.

Next it was determined how well phones can record the true shaking in an earthquake. Both the quality of the sensor and how well coupled the phone is to the ground play key roles here. Multiple phones were deployed on shake tables to answer this question; some were bolted to the table, others could freely slide. Our results confirm previous work that phones bolted to shake tables are capable of recording ground motion accurately between 0.5 and 10 Hz. We also tested phones placed freely on the shake table, since personal phones are not bolted to the ground.

Figure 3A:
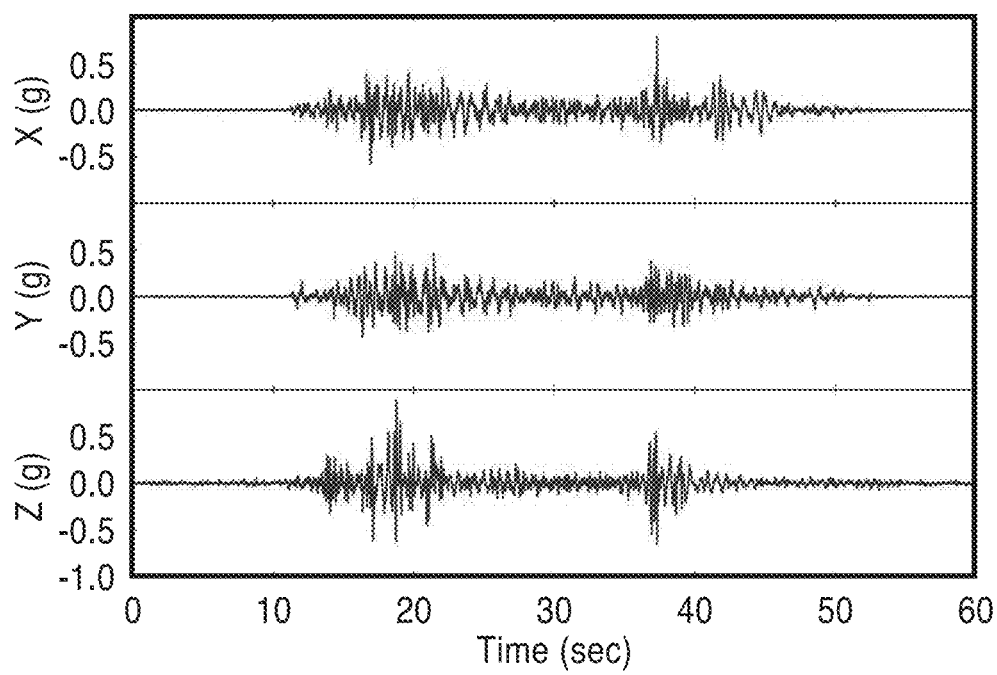
FIG. 3A and FIG. 3B are plots of results of three dimensional shake table testing on cellular phones, such as utilized according to an embodiment of the present disclosure.
Figure 3B:
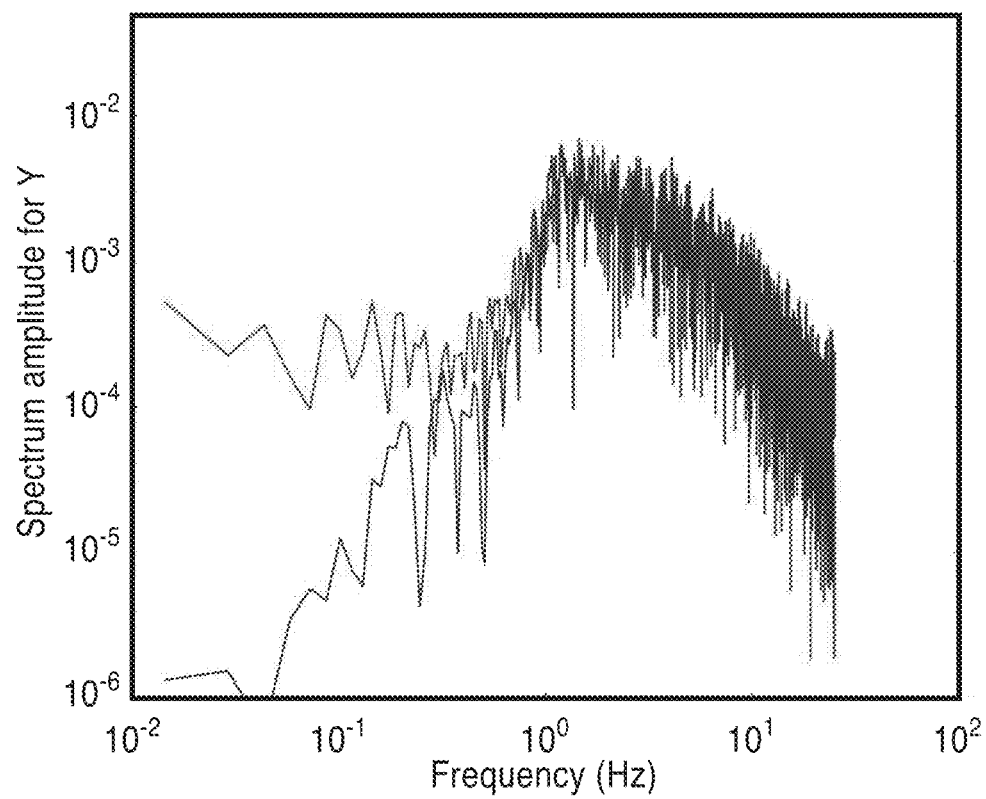

FIG. 3A and FIG. 3B depict results from a three-dimensional shake table test (X, Y and Z dimensions) with peak accelerations of 0.5 g. It should be noted that the input seismogram is from a real earthquake that has been modified for IEEE-693-2005 testing. In FIG. 3A a waveform comparison is shown between detection by a phone and a reference accelerometer for recordings from an input signal that has peak acceleration of 0.5 g. The original figure depicted these with different plot colors, however, because of the limitations imposed by the patent application system, all the figures here are depicted monochromatically, including both FIG. 3A and FIG. 3B. It will be noted that in this test, the X and Y components (X(g) and Y(g)), respectively, are seen in FIG. 3A in the plane of the phone, which is lying flat on the horizontal shake table and is not attached. The Z component (Z(g)), however, is perpendicular to the plane of the phone and is vertical for this test.

In FIG. 3B a spectrum comparison is made between Y components, between a reference accelerometer in upper plot from the left side, and a phone as seen by the lower plot entering from the left side of the graph.

The phone under test had some relative motion with the table, but minimal. It is seen from this plot that the waveform of the phone and the reference accelerometer are very similar, with the frequency response of phone acceleration being good (i.e., usable for earthquake sensing) from 0.5 Hz up to 10 Hz.

Figure 4A:
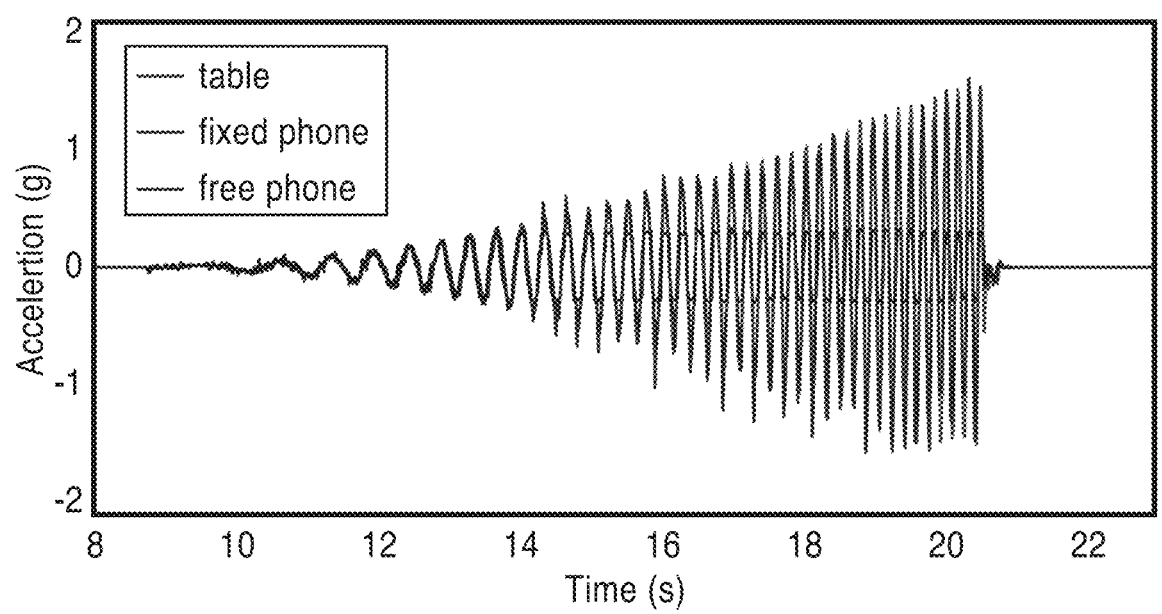
FIG. 4A through FIG. 4C are plots of cellular phone acceleration sensing, such as utilized according to an embodiment of the present disclosure.
Figure 4B:
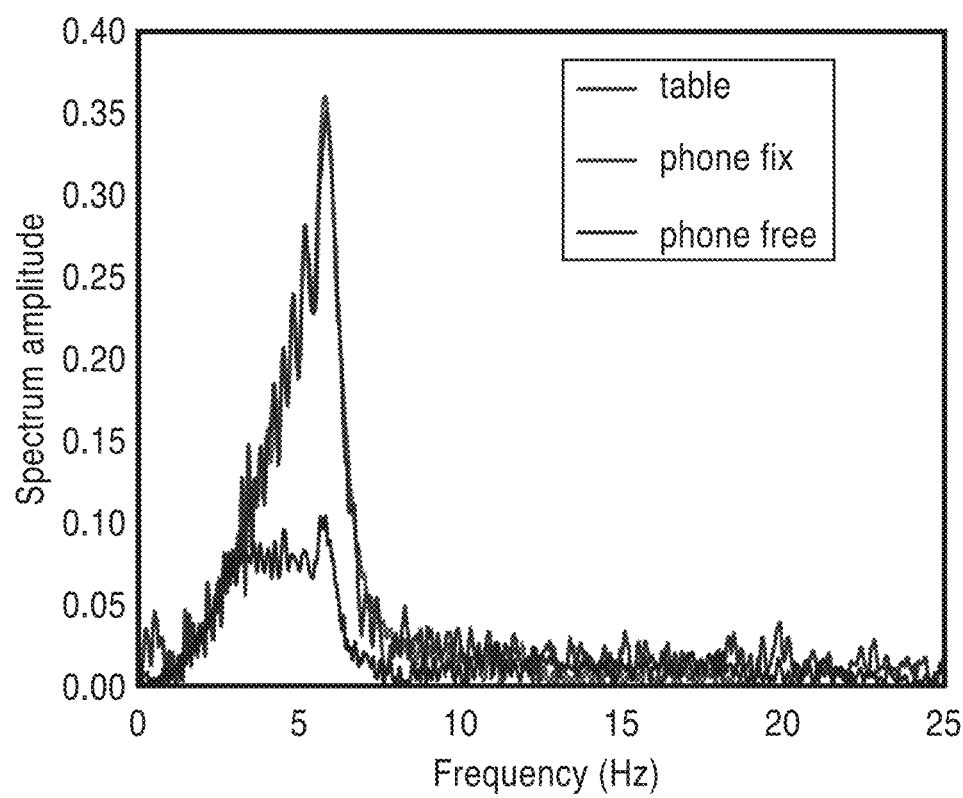
Figure 4C:
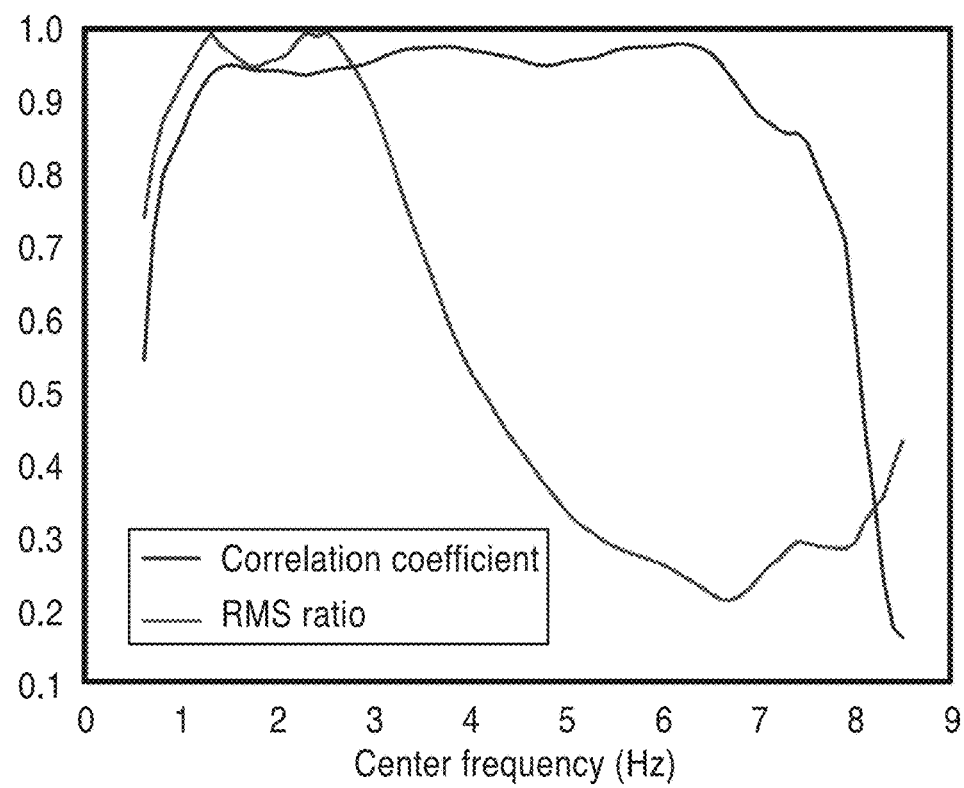

FIG. 4A through FIG. 4C illustrate additional information about the cellular phone acceleration sensing. In FIG. 4A a one-dimensional shake table test is shown with its sweep signal (increasing amplitude and frequency gradually from 0.5 to 7 Hz), it was found that sliding started after horizontal accelerations reached a certain threshold, in this case approximately 0.3 g and above about 3 Hz, which is seen by the clipped waveforms for the free phones. The table and fixed phone generally follow the same amplitude. In FIG. 4B a frequency domain comparison is shown for the signals in FIG. 4A, the upper curves for the table and fixed phone generally match, while the free phone is seen in the lower curve. In FIG. 4C a correlation coefficient and RMS (Root Mean Square) ratio was determined between the signal recorded by the phone placed freely on the shake table and the reference accelerometer. The correlation coefficient is a measure of the phase match and RMS is a measure for amplitude matching. A 1 Hz frequency band was utilized to filter the record and calculate the coefficient with a step frequency 0.1 Hz. The x-axis is the center frequency of the frequency band. The correlation coefficient is the broad curve mostly centering around 0.9 correlation between 1 and 7 Hz, showing how well the phase is recorded by the phone. The RMS ratio, seen as the curve dipping significantly above 2-3 Hz, shows amplitude recovery. It is noted with this curve that above around 2-3 Hz the phone starts to slide so the full amplitude is not recovered, although the other curve indicates phase is still recovered up to 7-8 Hz.

In view of the above, it is seen that when a free phone slides, it had the effect of clipping the peak amplitudes but the frequency content remained similar. This is a limitation of the data recorded, and thus it must recognized that recorded amplitudes from a free phone are lower bounds on the actual amplitude value. Given that a smartphone can record earthquake shaking, the key challenge for a smartphone network using private/personal phones is being able to separate earthquake shaking from every-day motion of the phone.

Figure 5A:
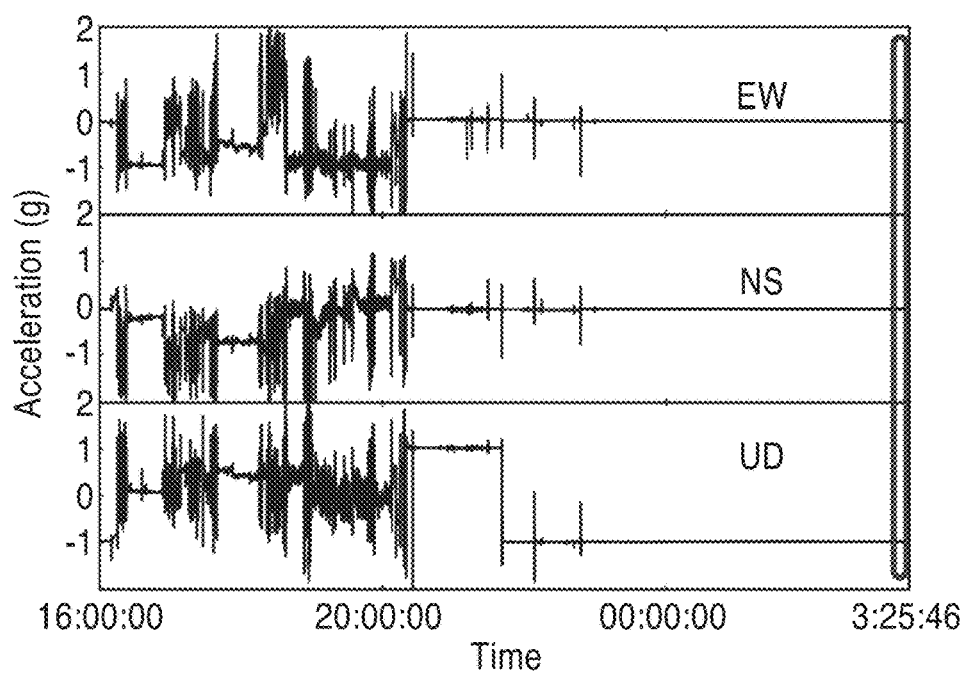
FIG. 5A through FIG. 5B are plots of additional earthquake data as recorded by cellular phones, such as utilized according to an embodiment of the present disclosure.
Figure 5B:
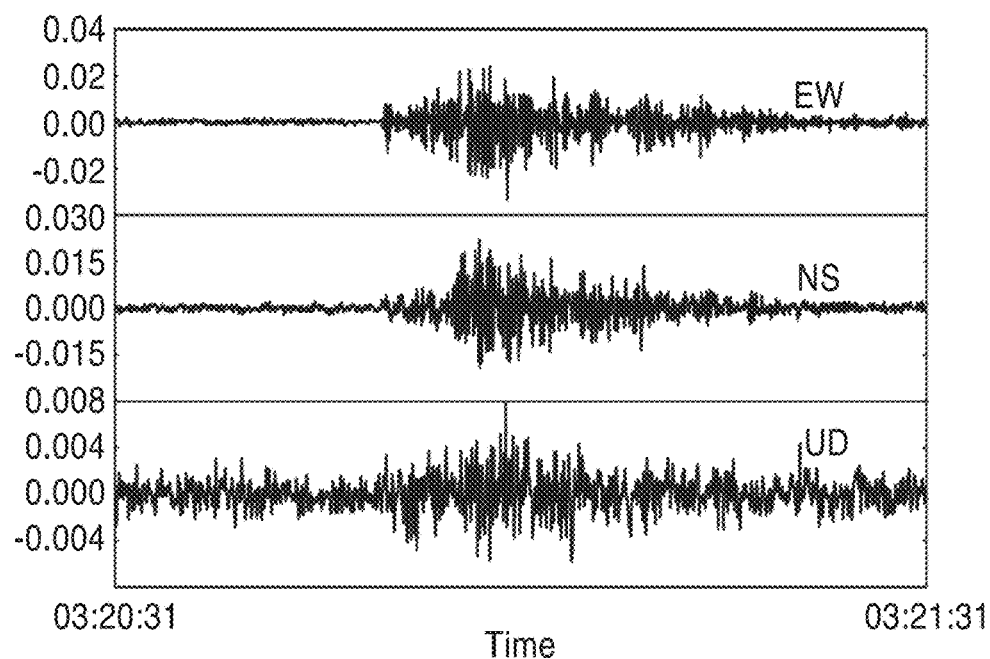

FIG. 5A through FIG. 5B illustrates additional data about earthquakes recorded by a phone. In FIG. 5A is an example 12-hour 3-component (East-West EW; North-South NS; and Up-Down UD) acceleration record from a private/personal Samsung® Galaxy S4 phone starting at 4 pm Aug. 23, 2014. It shows the accelerations of every-day human motions for the first approximately 8 hours, then appears stationary during the night. The box at the end of the figure highlights the time window that is seen in FIG. 5B. In FIG. 5B one minute of data is seen at the time of the M6 Napa earthquake 38 km from the phone. The earthquake occurred at 3:20:44 am local time.

Figure 5C:
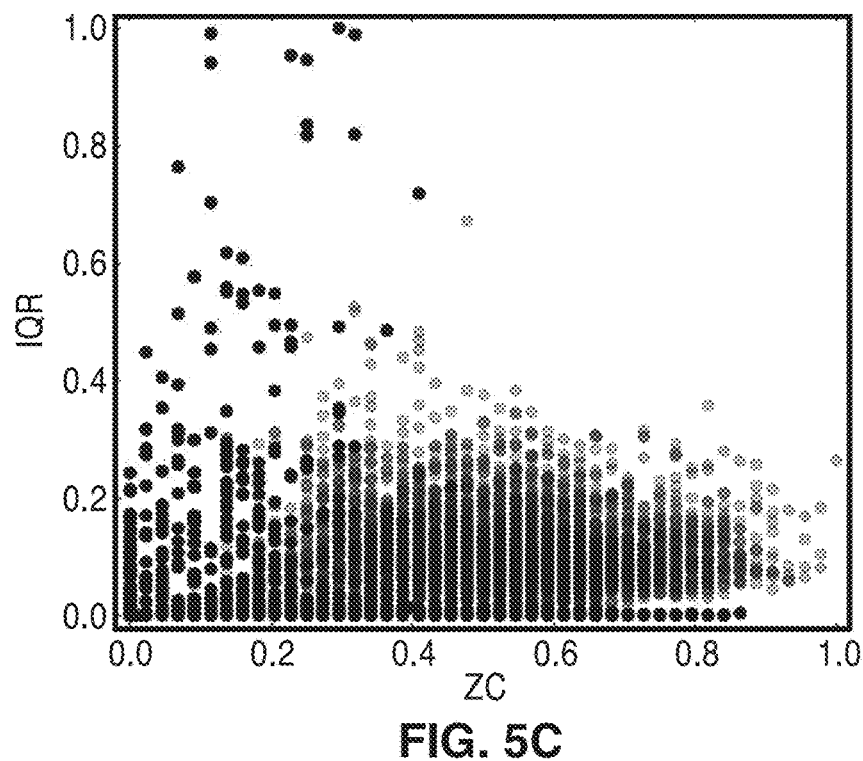
FIG. 5C through FIG. 5D are plots of waveform features used by an artificial neural network (ANN) for separating earthquake from human activities.
Figure 5D:
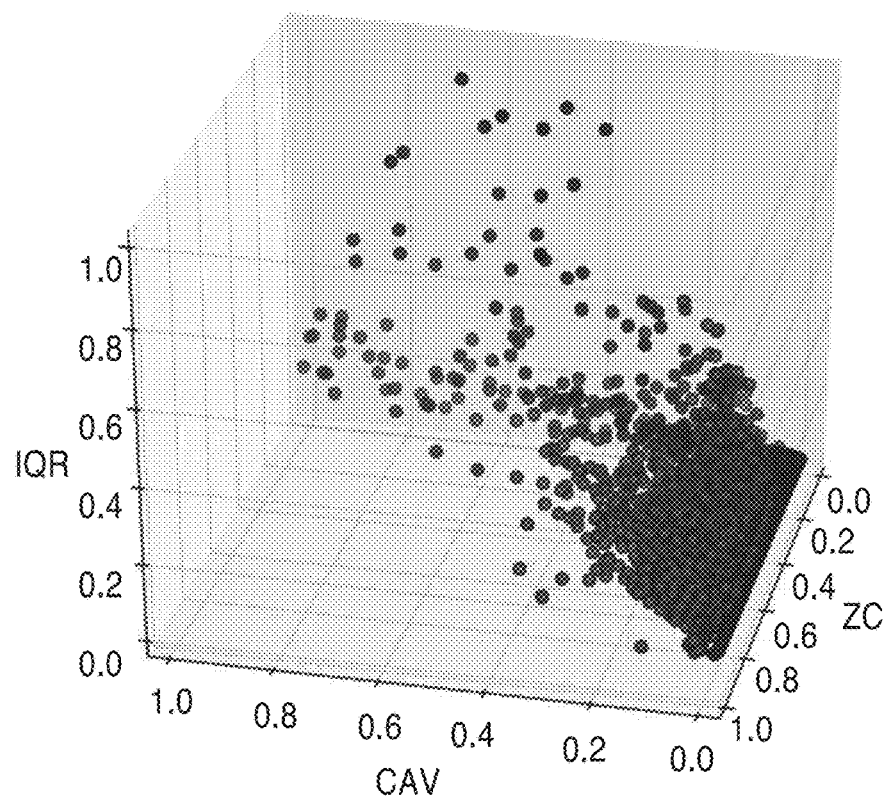

FIG. 5C through FIG. 5D illustrates plots of earthquake detection using the detection method on an artificial neural network (ANN) for separating earthquake activity from human activity. In FIG. 5C a scaled feature plot is seen showing acceleration vector sum (IQR) versus the maximum zero crossing rate (ZC) for the classifier training dataset. This plot in the application is more difficult to read, because the original was in red and blue colors showing, respectively, centroids of human activities, and earthquake features. In the plot in this application the majority of dots seen above ZC from 0 to about 0.25 are from human activity, with the higher dots thereafter indicating centroids of earthquake features. In FIG. 5D is seen a 3D plot of the 3 features utilized to distinguish earthquakes. Adding the CAV to IQR and ZC drags some of the human activates to the third dimension but not the earthquake data, this helps improve the results. Again this is harder to read in a single color plot, but the majority of dots in the main group are earthquake parameters.

In order to develop a mechanism to separate earthquake shaking from human activities, an application was developed for Android smartphones to trigger on significant motions, and send the data to a central processing center (CPC). This application has been designed for distribution to personal/private phones and has a trigger detection method that runs in the background monitoring the accelerometer continuously. It uploads parameters and data to the CPC when triggered. In at least one embodiment the CPC is configured for: (a) monitoring and changing operational parameters on the user phones, (b) collecting heart-beat and state-of-health information from the phones, (c) collecting autonomous phone-trigger information, (d) triggering phones from the CPC to record data, and (e) uploading waveform data for autonomous and CPC triggers.

Figure 8A:
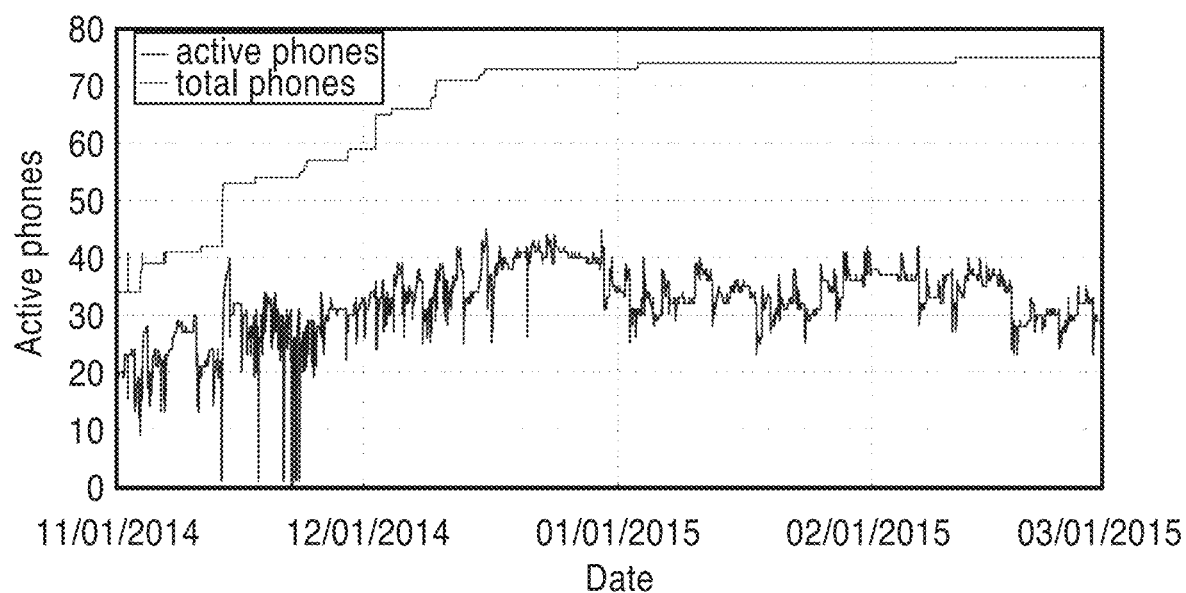
FIG. 8A and FIG. 8B are graphs of active phone deployment and triggers for a test release of the MyShake application according to an embodiment of the present disclosure.
Figure 8B:
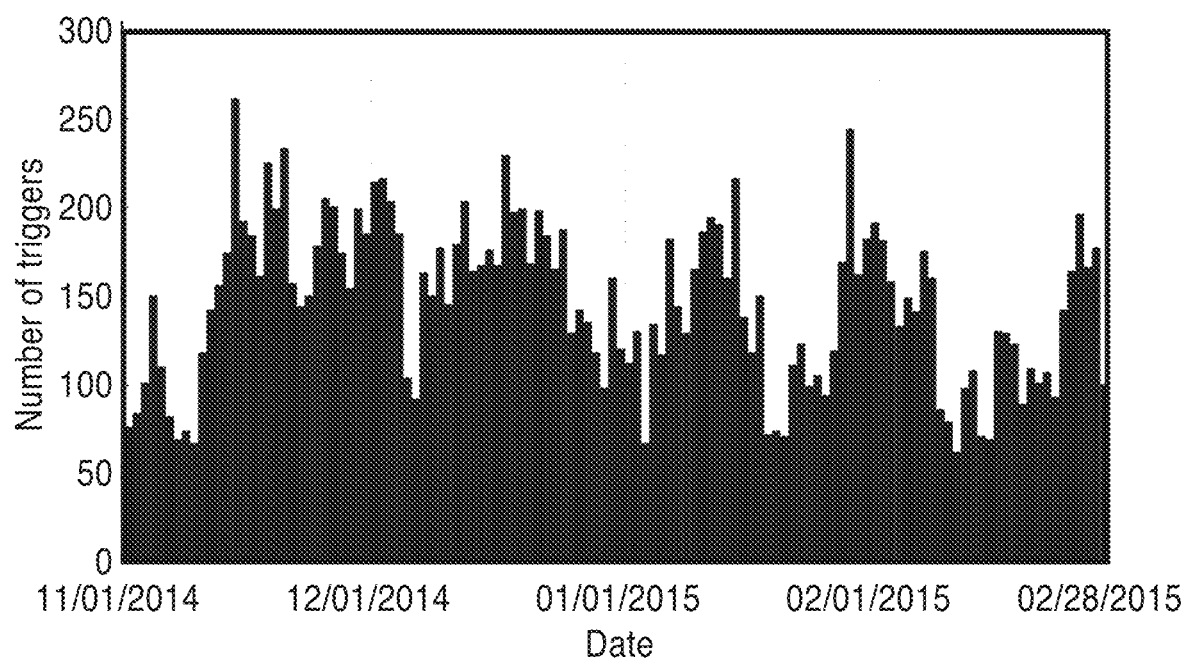

A small release of MyShake deployed the application on 75 phones (FIG. 8A and FIG. 8B). A key issue for a crowdsourcing application to be successful is minimizing the impact on the users: in the case of a phone this means minimizing power usage. The MyShake application currently uses about the same power that a smartphone uses when it is on, but is not being used. For most users, a phone running MyShake does not need to be charged more than once every 24 hours.

Using the data collected, an Artificial Neural Network (ANN) embodiment was developed to identify the different characteristics of earthquake and human motions. The method assesses time windows (e.g., 2 second windows) of data and determines if the motion is likely an earthquake or not. The method is first trained for performing this earthquake discernment. The training data comes from three sources: every-day motion recordings uploaded to the CPC from the MyShake release as described above, phone recordings of earthquakes from shake table tests, and seismic data from traditional networks in Japan that was modified to reproduce smartphone-quality records, which is described in supplementary material in a later section. A total of 18 characteristics were used identifying the 3 best features: Interquartile range of the acceleration vector sum (IQR), the maximum zero crossing rate (ZC), and the cumulative absolute velocity of the acceleration vector sum (CAV). IQR is an amplitude parameter that shows the middle 50% range of amplitude of the movement. ZC is a simple frequency measure that counts the number of times when the signal crosses baseline zero. CAV is a cumulative measure of amplitude on the three components in the time window and is determined as follows:

$$CAV = \int_0^2 |a(t)| dt \quad (1)$$

where a(t) is a vector sum of the 3 components of acceleration. FIG. 5C described above showed how IQR (a measure of amplitude) and ZC (a measure of frequency) separate earthquakes from non-earthquake motions. Earthquakes are high frequency with moderate amplitudes while every-day motions are lower frequencies but high amplitudes or very low amplitudes but high frequencies. The IQR and ZC are the best two parameters to separate earthquakes, but adding CAV can provide some additional information to help improve performance as was seen in FIG. 5D.

The trained ANN system is then applied to earthquake data modified to phone-quality records and a separate set of every-day motion data (Table 1). In this testing it was found that 98% of the earthquake records (US records) within 10 km of the events were properly recognized as earthquakes. The success rate of the method reduces with increasing distance and decreasing magnitude as expected. While 93% of the every-day motions are correctly recognized, meaning that for an operational system it should be expected to receive approximately 7% false earthquake phone triggers.

The final component of the system is a network detection method running at the CPC to confirm when an earthquake is underway, and estimate source parameters from multiple triggered phones in a region. When a phone determines that it is recording an earthquake, two types of data are passed to the CPC: (a) the trigger information including trigger time, phone location, and the maximum amplitude of the 3 components, and (b) waveform data that contains 3-component acceleration from 1 minute before the trigger to 4 minutes after. The trigger information is easier to upload rapidly via cellular or Wi-Fi networks and is what is utilized for real-time processing. The waveform data is currently uploaded with a lower priority than the trigger information and only uploaded when the phones are connected to Wi-Fi and power.

One embodiment of this EEW network detection method is to search for a temporal and spatial cluster of triggers, and requires greater than 60% of operating active phones to have triggered within a 10 km radius region for an event to be declared, details described in a later section. Once an event is created, the system continues to update the origin time, location, and magnitude of the earthquake based on the continual flow of trigger information. Currently, the origin time is set to the earliest trigger time, and the centroid of all the triggered phones within 10 km of the phone trigger is used as the epicenter. This first generation magnitude estimation is based on expected ground shaking amplitude as a function of distance. Peak Ground Acceleration (PGA) and the distance of the station is utilized to estimate the magnitude using the following regression relation based on the earthquake data from Japan that was modified to reproduce smartphone-quality records:

$$M_{est}=1.352 \times \log(PGA)+1.658 \times \log(distance)+4.858 \quad (2)$$

where PGA is the maximum absolute amplitude from the 3-component acceleration, and distance is the epicentral distance derived from the phone location and estimated location of the earthquake.

Figure 6:
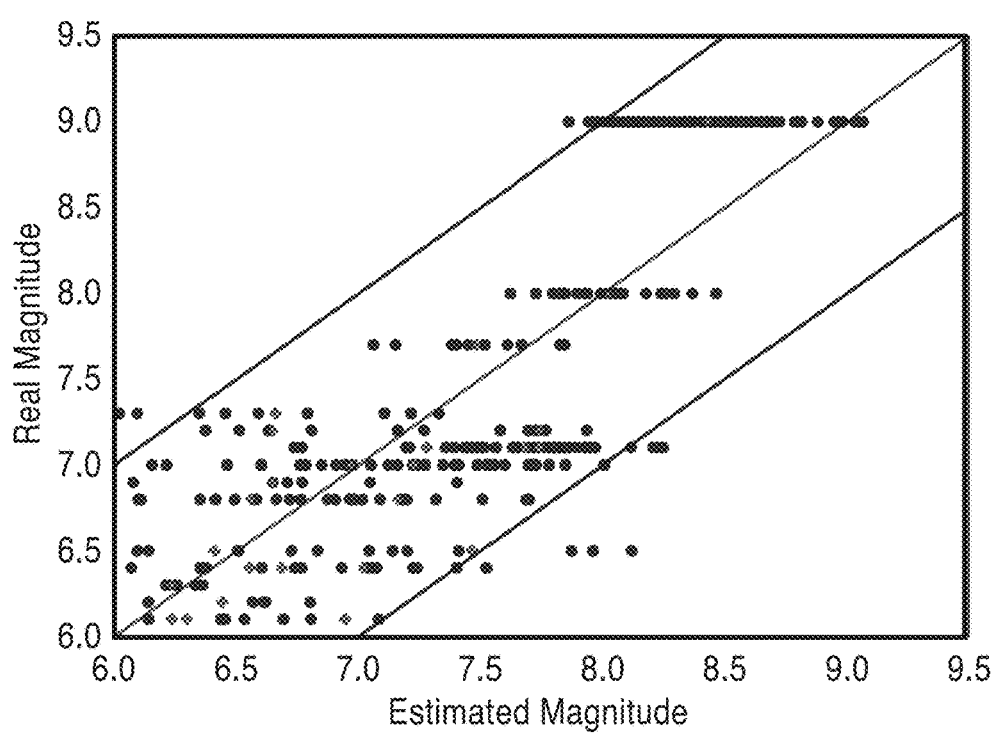
FIG. 6 is a plot comparing real magnitude with cellular phone estimates determined according to an embodiment of the present disclosure.

FIG. 6 compares estimated magnitude and real magnitude for both an individual phone depicted by dots and the average event estimates depicted as plus signs. It can be seen that most of the estimated magnitudes are within 1 magnitude unit for individual phone, and all average event estimates are within 1 magnitude unit. When the network consists of many more phones, one might expect the uncertainty in the magnitude to be reduced. However, it must also be recognized that phone-based amplitude estimates must be treated as lower bounds given the possibility of decoupling. Given these uncertainties, it is clear that having even a single observation from a traditional seismic station could make a significant difference providing some "ground truth" to the magnitude estimate.

The final step for an alert is to estimate the shaking intensity and time till shaking at a users' target location. This is relatively straight forward using the estimated event epicenter, origin time and magnitude, the users' location, and S-wave travel time curves and ground motion prediction equations just as with the current EEW system in California.

It is a known problem that magnitude estimates based on peak shaking observations from seismic stations can saturate; which is also true for MyShake. There are several ways of improving these estimates, the following being given by way of example and not limitation. Firstly, the smartphone-based magnitude estimate could be improved by updating the magnitude based on the area experiencing strong shaking. Stronger magnitude earthquakes cause strong shaking over large areas. Another possibility is to make use of GPS-based permanent ground displacements as is being done with the more traditional network-based early warning systems. It was recently shown that smartphone-based GPS observations could be used for EEW. The challenge when using only GPS on smartphones is that GPS is very power-hungry. In one hybrid embodiment, the present disclosure is configured to start monitoring the GPS on a phone when the MyShake classifier identifies an earthquake. This can provide an updated magnitude estimate that does not saturate, while overcoming power issues associated with an only-GPS approach.

The disclosed network detection mechanism was applied in a simulated real-time manner to phone-like triggers for US earthquakes with results shown in Table 1. For the stations that are close to the epicenter (within 10 km), almost all stations are triggered.

Figure 7A:
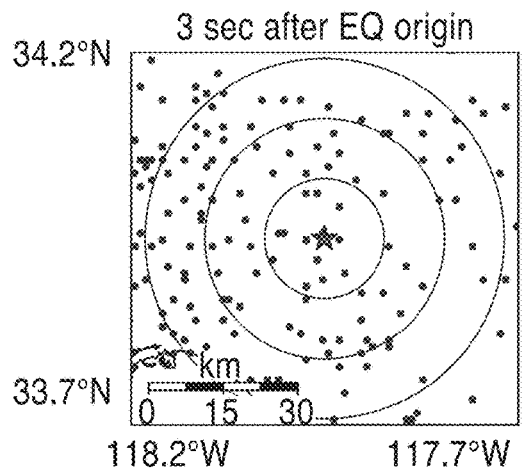
FIG. 7A through FIG. 7C are plots of simulated cell phone response for the La Habra earthquake utilizing an embodiment of the present disclosure.
Figure 7B:
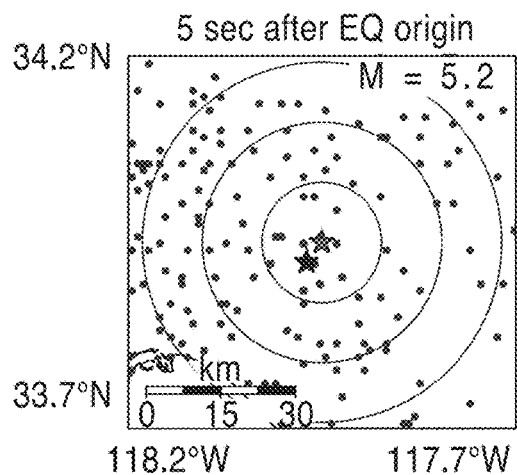
Figure 7C:
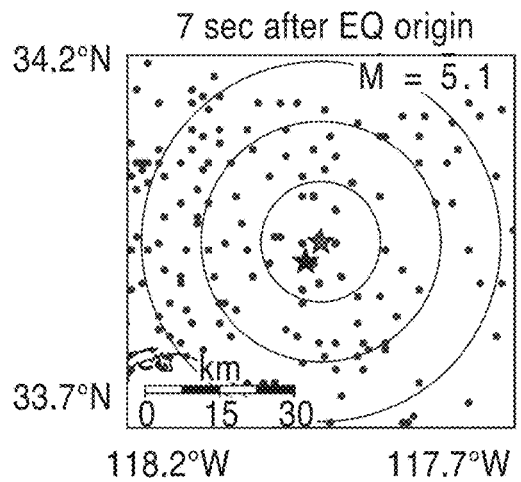

FIG. 7A through FIG. 7C shows performance snapshots for the M5.1 La Habra earthquake, which had the poorest success rate in triggering on individual phone-like waveforms due to the relatively small magnitude compared with other test earthquakes (Table 1). The figure shows the location of the triggers at each time step; the radiating nature of the ground motion and associated triggers is clearly seen. The true earthquake location is seen as the lighter shaded star at the center of the circles having 10, 20 and 30 km radius. The darker shaded star represents the estimated event location, first detected at 5 seconds. The magnitude estimate at each point in time is shown upper right.

In FIG. 7A the motion triggers are shown at 3 seconds after EQ origin. The earthquake is then first identified 5 sec after the origin time as seen in FIG. 7B. The error in the initial magnitude estimate is 0.1 magnitude units, the location error is 3.8 km, and the origin time error is 1.7 sec as seen in Table 3.

The performance of this MyShake simulation is similar to the actual performance of the real-time ShakeAlert/ElarmS EEW system, which issued its first alert 5.3 seconds after the origin time with an initial magnitude error of 0.8, location error of 1.5 km and origin time error of 0.2 seconds. In a real situation, having a denser phone network, earthquake detection would occur more rapidly (in less time).

In addition, 1000 simulations were conducted for a M6.0 earthquake that incorporate random human-activity triggers in addition to earthquake triggers to explore system performance for different densities of phones. In all these cases high levels of detection were provided performance, such as similar to the La Habra example, was provided when there are 300 or more phones in a 111 by 111 km region, corresponding to an average distance between phones of 6.4 km, as seen in Table 4. In the table of simulated network performance for various phone densities, the value N is the number of randomly distributed stations within a 1°×1° box (approximately 111 km×111 km). The location errors are the differences between the true earthquake location and the estimated earthquake location. The origin time errors are the time difference between the true earthquake origin time and that estimated. The detection time is the time after the true earthquake time that the MyShake system detects it. In all cases the average value is shown with ±standard deviation. The last column shows the number of simulations in which the earthquake was not detected.

If the number of phones drops to 200 in the same region, then out of 1000 simulations, it was found that 32 events were not detected, resulting in approximately 3% of the events being missed. In addition to missing some earthquakes, the accuracy of the locations and origin times is degraded. A second group of 1000 simulations was also performed without earthquakes, just false triggers. None of these generated a false event. This is because this embodiment of the method requires greater than a threshold percentage (e.g., 60%) of active phones within a threshold radius (e.g., 10 km radius) region to trigger for an event declaration to be generated. One desired design goal is to have much smaller distances between active phones than 6.4 km. In a preferred embodiment the network classification method is modified in these higher phone density scenarios to reflect the active network, and more preferably performing these network updates in real-time.

3. Discussion.

FIG. 8A and FIG. 8B depict a small release of MyShake, in which the application was deployed on 75 phones. The number of active phones in relation to the number of total phones is seen in FIG. 8A. The number of human activated triggers is seen in the bar graph of FIG. 8B.

The MyShake project to date demonstrates proof-of-concept for a smartphone-based seismic network that provides instrumental recordings of ground shaking in damaging earthquakes, and potentially delivering earthquake early warning. A very important element is that the system has been designed for and tested on privately owned smartphones, of which there are billions. To harness the full potential of crowd sourcing, scientists must use sensors that are already being purchased by consumers, and to develop systems that can harness the data from these sensors with minimal impact to the owners, while providing owners real benefits to participating. MyShake uses the accelerometers on common smartphones, and the application can be made freely available from any of a number of online play stores (e.g., Google Play store) for easy installation and automatic update, while it uses minimal power whereby phones only need to be recharged daily as is common practice, and participation leads to delivery of earthquake hazard information and in at least one embodiment of the system includes the delivery of earthquake shaking alerts.

In the future, existing earthquake early warning systems that use traditional seismic and geodetic networks could benefit from MyShake just as MyShake could benefit from integration of data from traditional networks. As described above, observations from even one traditional seismic station could help reduce uncertainties in MyShake earthquake estimates. Likewise, a handful of MyShake phone triggers could be used to confirm a preliminary earthquake detection from one or two traditional network station triggers; most traditional EEW systems require several stations to trigger before issuing an alert. Finally, and perhaps most importantly, MyShake could deliver alerts in regions that have little in the way of traditional seismic networks. This includes Haiti and Nepal that both had recent devastating earthquakes, and other high hazard regions like Iran, Afghanistan, Pakistan, Mongolia, Malaysia, Indonesia and the Philippines. As an example, the recent earthquakes in Nepal are estimated to have killed over 8000, while there are only a handful of seismic stations in the region. Yet, there are an estimated 6 million smartphones in Nepal. Based on the 80 km separation of the M7.8 epicenter from Katmandu where most of the fatalities occurred, a warning system could provide about a 20 second warning.

Furthermore, the present disclosure contemplates utilizing seismic sensing in cell phone towers, which are ubiquitous and stationary, in addition to and/or as an alternative to traditional seismic and geodetic networks, in combination with the cellular phone earthquake sensing. It will be appreciated that cell phone towers traditionally already sense other operating parameters, such as sensing temperature, humidity, voltages and the like, to which a dedicated acceleration sensor could be readily added. These seismic sensing cell phone towers could be utilized in a number of ways with the present disclosure. For example, they could be used for local processing centers and/or act as a gatekeeper, so to speak, based on their own seismic sensing to further or more readily, differentiate between valid earthquakes and human activity. If multiple cellular towers are in the area they can corroborate between themselves toward further increasing false positives, and still collect localized data from the cell phones for properly mapping intensity and time.

Finally, MyShake is first and foremost a seismic network, for which we have developed an early warning mechanism. The network could provide millions of seismic waveforms for a wide range of research activities following large magnitude earthquakes in urban environments. This data could be used to generate microseismic maps providing information about local amplification effects, and be used to study the impact of the shaking on buildings. The data could also potentially be used to image shallow Earth structure beneath our cities, and perhaps even to image the earthquake rupture process itself.

4. Materials and Methods.

4.1 Data Collection.

The MyShake application was used to collect all smartphone data used in this disclosure. It can be installed on mobile devices, presently Android phones, to record acceleration data. For the noise floor tests and shake table tests, MyShake recorded continuously, and saved the data locally on the phone. The human activity data was recorded using a trigger-based method, five minutes of data was collected when the phone satisfied the trigger.

4.2 Noise Floor Test.

The noise floor tests were performed by putting smartphones in a quiet basement. The phones recorded continuously for one month at 50 samples per second.

4.3 Shake Table Test.

The shake table tests were conducted at the Pacific Earthquake Engineering Research Center. The phones recorded at 50 samples per second continuously when the shake table simulated the earthquakes. A high quality reference accelerometer also installed on the shake table provided the reference traces. The recordings from the phones and reference accelerometer were then compared both in the time and frequency domain. During the tests, some phones were bolted on the shake table while the rest were placed freely on the table.

4.4 Single Phone Detection Design.

The earthquake detection method running on the phones was designed using past earthquake data, in this case from traditional seismic networks but modified to be phone-like quality, as well as based on shake table data, and human activity data recorded on the smartphones. In one embodiment an artificial neural network (ANN) was utilized to distinguish earthquakes from human activities, although one of ordinary skill in the art will recognize that traditional programming may be used alternatively, or in combination with ANN mechanisms.

4.5 Network Detection Algorithm Design.

The network detection method is designed based on the general principles of current ElarmS-2 methodologies. The disclosed method searches for temporal and spatial clusters of triggers from active phones. The method was tested both on simulated earthquake data and simulated trigger data.

5. Supplementary Materials: Data collection—The MyShake Application

In this embodiment of the invention, "MyShake" was implemented as an Android® application and released for installation on private/personal phones. An initial test release was aimed at student volunteers on the UC Berkeley campus. The trigger mechanism at the time comprised a short-term average (STA) and long-term average (LTA) (STA/LTA) mechanism. The application first required the phone to remain stationary for 30 minutes, meaning the acceleration is minimal and most likely the phone is sitting on a stationary surface. When it meets this requirement, the phone enters into "steady state". The ratio of short-term average (STA) and long-term average (LTA) on any of the 3-components must then exceed a threshold to trigger. When it does, trigger information was immediately sent to CPC including the phone location, time of the trigger, phone ID, and the maximum amplitude. A select duration of data, in this example a total of 5 minutes of data, was also stored locally on the phone from a predetermined time before the trigger (e.g., 1 minute) to a predetermined time after the trigger (e.g., 4 minutes). A ring buffer stores a predetermined amount of accelerometer data (e.g., one minute) in memory at all times for this purpose. The application also periodically uploads state-of-health (SOH) information (e.g., every 2 hours) and can receive updates and triggers from the CPC. The SOH information provides the system with basic information about the number of phones running the application, their location, lifetime of the application, and other information as necessary.

The system can also update/change the settings of the application on an individual phone or all phones from the CPC, for example changing the trigger parameters. Finally, seismic recording can be triggered on a phone from the CPC. Either individual phones or the entire network can be triggered to record these waveforms for a period of time. The waveform data was only uploaded when the phone was plugged into power and had a Wi-Fi connection to minimize power and data-plan usage. All these parameters can be modified remotely. In this example four months of triggered human activity data for our training and testing dataset.

Accurate time recording is important for all data. The drift in the internal clock on the phones is typically unacceptable for earthquake-related applications, typically ranging from 0.4 to 8.6 sec/day. Thus, in at least one embodiment it is preferable that geographically distributed nodes synchronize their clocks. In recent years, significant research has been conducted to synchronize different internal clocks by referring external signal sources such as power lines, FM radio, Wi-Fi, mobile station, and so forth. Of these synchronization mechanisms, the Network Time Protocol (NTP) is perhaps the most commonly used clock synchronization protocol. With a very low network and computation cost, NTP is able to synchronize all the participating nodes within a few milliseconds. In the MyShake application all the accelerometer data is associated with its local device clock, so we synchronize them to Coordinated Universal Time (UTC) utilizing NTP. By way of example and not limitation, the MyShake application synchronizes its local clock every hour, thereby minimizing network and computation cost while ensuring sufficient clock accuracy at all times. It should be appreciated that other forms of synchronization may be utilized without departing from the teachings of the present disclosure.

In at least one embodiment the system is configured to alternatively, or more preferably additionally, adjust the times reported from the cellular phones based one on or more criterion. In at least one example, the cell phone reports a time value when communicating its trigger information call to the CPC, and basically the time the call was received at the CPC is subtracted plus some offset for delay and ringing, to adjust or invalidate time values for the phone. This can be valuable even when using other synchronization, such as NTP synchronization, to check that reporting nodes are properly synchronized. This can prove more accurate than just removing outlier data from the reporting data of the cellular phones.

Power usage of the application is also important. Careful selection of which sensors to use and when sensing is to be performed, can reduce power needs to a level that would not impact normal daily smartphone use. One goal for the system is to provide an application that could continuously run in the background and still only require the phone to be charged once per day for most/typical phone users. Working within these power requirements, we found that it is possible to monitor the accelerometer data continuously all day. However, it is not possible to continuously use the GPS unit, as it draws significant power. Instead, the GPS function is only accessed at specific times when needed by the system. For the initial release we only attempted to obtain a location when the phones triggers. When a location request is made to the phone, it returns the best available location. If a GPS location is available it is returned. If not, then the location based on triangulation with cell phone towers is used, if not, then the last available location is used.

The current version of MyShake is modified to add the classifier analysis developed to distinguish earthquake from non-earthquake motions, and the use of GPS location has been modified. The recent system embodiment continues to have the same initial STA/LTA trigger requirement, after the STA/LTA triggered, using a fixed size data window (e.g., 2-seconds) with a fixed step size (e.g., 1-second) to calculate the three key features (IQR, ZC and CAV) up to a desired time period (e.g., 10 seconds) after the STA/LTA trigger. The calculated features in each time window are fed into the Artificial Neural Network (ANN) detector (on the phone) to determine if it is a likely earthquake or not. This two-step approach is implemented so that power requirements are not increased, since the STA/LTA method is a simple and low cost computation method. The approach to determining location has also been improved by determining the best available location at the time the phone enters steady state. In at least one embodiment, at the time the phone enters steady state, the application attempts to sample GPS location. It may take a few seconds to minutes before it gets a stable GPS location. Since phones typically sit in steady state for some time (while sitting on a desk or charging over night) it is unlikely that a trigger occurs in the first few seconds or minutes. If for some reason the phone cannot get the GPS location, for instance the phone being inside a large building, then the cell phone network location that based on cell phone towers is used. The phone then stores the best available location for the duration of the steady state phase and associates it with the other trigger information when the phone next moves.

6. Classifier Analysis: Detecting Earthquakes On A Phone.

By way of example and not limitation, in the described implementation three types of data were used for training, validating and testing the classifier mechanism. Firstly, normal human activity data collected from the initial MyShake release was used for these purpose. For waveforms to be uploaded, the phone must be stationary, and then move to trigger the STA/LTA mechanism as described above. Then a period (e.g., 10 seconds) of data immediately following the human trigger was used in the disclosed analysis. In this example embodiment, the first three months of initial data collection were used to train and validate the mechanism, and the last month was kept for final testing.

The second type of data consisted of earthquakes recorded on smartphones that were placed on a shake table. These included 241 3-component records from 45 shake table tests runs. The input waveforms into the shake table were past earthquakes with amplitudes rescaled to satisfy the displacement capabilities of the shake table.

Figure 9:
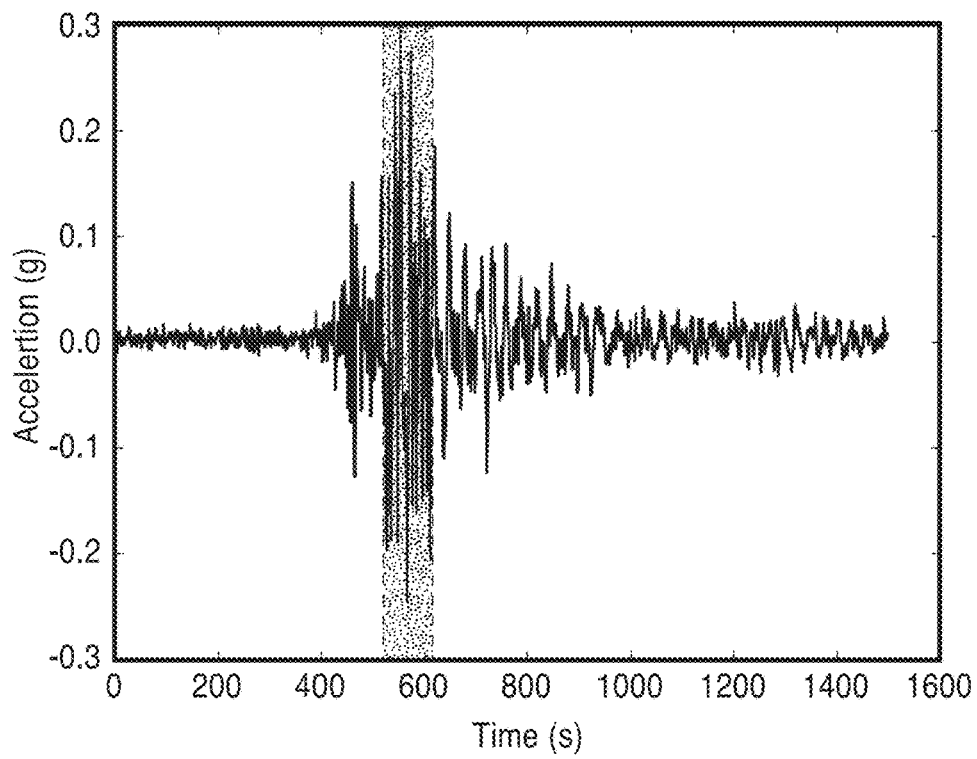
FIG. 9 is a plot of a waveform from a real earthquake as utilized for training the system according to an embodiment of the present disclosure.

FIG. 9 depicts waveforms from a real earthquake and shows how the data was selected to train the system. The shading shows only the strongest portion of the waveforms recorded by the smartphones which were selected for use. Focusing on the strongest portion of the waveforms improves earthquake distinction, as it is difficult for the disclosed classifier to distinguish weak earthquake shaking from human activities. This dataset was used entirely for the training and validation phase.

The third type of data also consists of earthquakes, but recorded on regional seismic networks in Japan and the United States (US). It was first modified to replicate waveforms recorded on a smartphone. To do this the process first converted the 24-bit data to 16-bit data, then a smartphone noise record was added from the noise floor tests to produce accelerometer records similar to what would be recorded on a phone laying on a sturdy table during the event. Phones are not expected to trigger on the initial low-energy P-waves, especially for smaller earthquakes, instead to trigger on the larger amplitude portions of earthquake shaking.

In FIG. 9 the example earthquake record was used to train the ANN classifier mechanism. The waveform is the EW component from a regional network station 16.5 km from the epicenter of the western Tottori earthquake (M7.3) of Oct. 6, 2000. The data has been modified to represent a smartphone recording at the same location. In this example only a 2-second windows of data from the shaded region were used to train the classification mechanism.

Strong motion data was utilized from Japan's KiK-Net and K-Net to train and validate the disclosed sensing methods. Data with horizontal peak amplitude greater than 0.2 g for the period from Jan. 1, 1996 to Feb. 1, 2015 was downloaded from NIED (National Research Institute for Earth Science and Disaster Prevention). A total of 317 3-component records from 203 events were selected. To further test the performance of these methods, earthquake data was used from the California Integrated Seismic Network (CISN.org). We used 389 3-component records within 30 km of the earthquake epicenter from 5 events that obtained from CESMD (Center for Engineering Strong Motion Data), NCEDC (Northern California Earthquake Data Center), and SCEDC (Southern California Earthquake Data Center), the results are shown in Table 1. It will be appreciated that other data may be utilized for training purposes without departing from the teachings of the present disclosure.

All data was first high-pass filtered in a simulated real-time manner. A range of characteristics in overlapping data windows (e.g., 2-second) was determined in time steps (e.g., 1-second steps). Different window lengths and step lengths were tested and the values chosen were found to be a workable compromise between having more data and keeping the window short to detect earthquakes more rapidly. A total of 18 different features including frequency features, amplitude features, and statistical features were tested. All features had low to moderate computational requirements making it feasible to rapidly determine their values on a phone.

Since there were far more data points from human activities than that from earthquake data, this imbalance of classes could impact the disclosed classifier. In order to create a dataset with equal classes, the k-means cluster method was utilized in the system to group the human activities into a number of clusters, with the number of clusters being equal to the number of earthquake data points. The centroid of the cluster was taken to represent human activity data. This not only created a balanced dataset for us to train the disclosed classifier, but also reduced the computational burden during training.

By way of example and not limitation, it was decided to use the best 3 features to distinguish between earthquake and non-earthquake data using greedy forward feature selection. These three features comprise: (1) interquartile range (IQR) between the 25th and 75th percentile of the acceleration vector sum, (2) the zero crossing rate from the component with the highest value (ZC), and (3) the cumulative absolute velocity (CAV) of acceleration vector sum. IQR is an amplitude parameter that shows the middle 50% range of amplitude of the movement. Zero Crossing (ZC) is a simple frequency measure. CAV is a cumulative measure of amplitude on the three components in the time window and is determined as was seen in Eq. 1.

An ANN (artificial neural network) approach was utilized in at least one embodiment to classify a particular data window as an earthquake or not an earthquake. Each feature was first scaled to a range of 0 to 1. In at least one example embodiment, ANN was configured with one hidden layer and completed a grid search to test different numbers of neurons.

Figure 10:
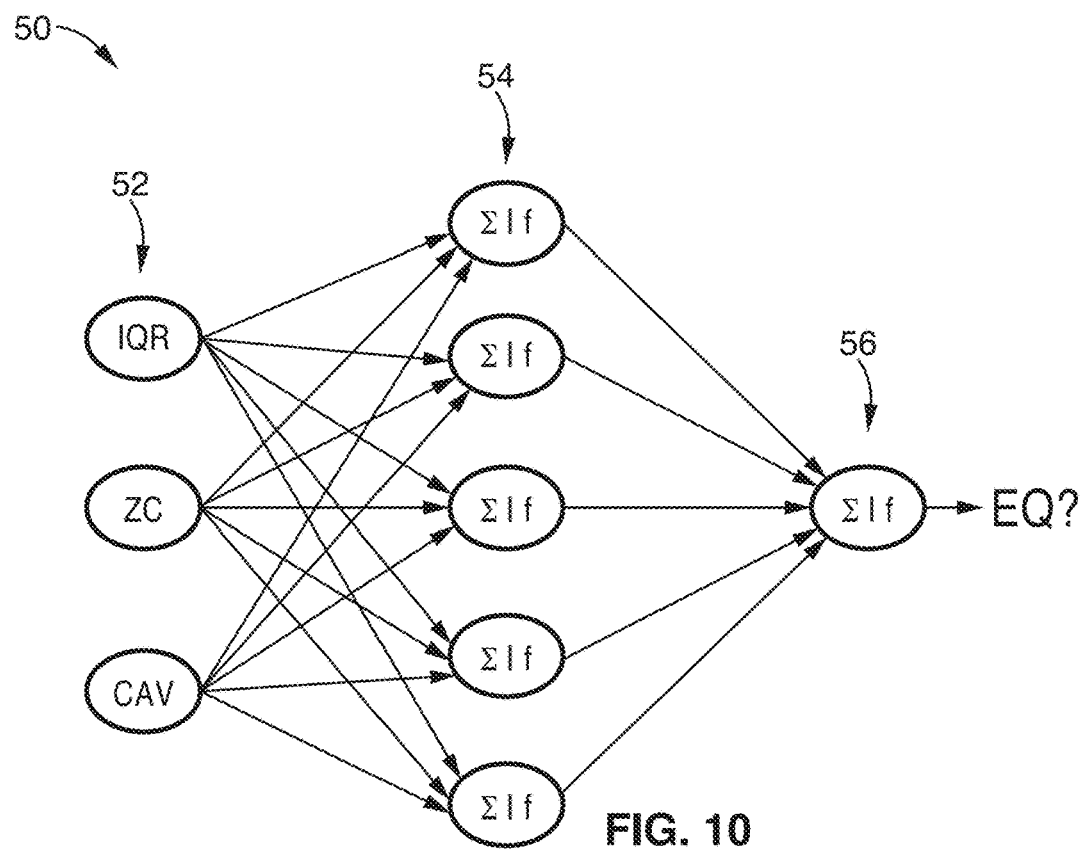
FIG. 10 is a layer topology diagram of an artificial neural network (ANN) for classifying triggers from cellular phones as earthquakes according to an embodiment of the present disclosure.

FIG. 10 illustrates an example ANN embodiment 50. It was found in testing ANN configurations, that we obtained the best performance with the ANN having 1 hidden layer with 5 neurons with a standard sigmoid activation function, although other configurations can be utilized, with different numbers of layers and neurons per layer, without departing from the teachings of the present disclosure.

The example is shown in FIG. 10 with three layers: an input layer 52 with 3 nodes (IQR, ZC, and CAV inputs), a hidden layer 54, such as with 5 nodes, and an output layer 56 with 1 node. For the hidden layer and output layer, the inputs from the previous layer to the each node will be first summed and then fed into an activation function shown as f.

The standard sigmoid activation function is defined as:

$$s(x) = \frac{1}{1+e^{-x}}$$

The ANN was trained and validated using a period (e.g., 3 months) of human activity data, and earthquake data from shake table tests and Japanese events. The dataset was split multiple times, using a first portion (e.g., 70%) of the data for training and a second portion (e.g., 30%) for testing for cross-validation tests. The accuracy of the classifier when applied to the test datasets is very high, showing 98% to 99% accuracy each time (Table 2 and FIG. 11).

Figure 11:
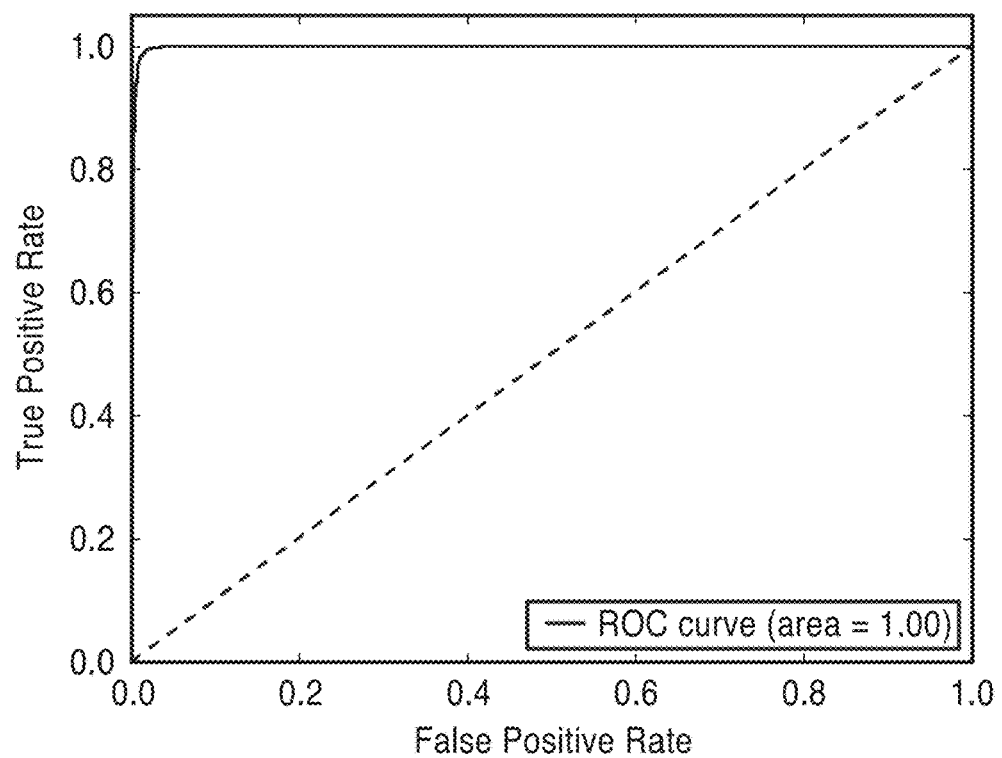
FIG. 11 is a plot of a receiver operating characteristic (ROC), showing ANN classifier performance from data recorded by smartphones utilized according to an embodiment of the present disclosure.

FIG. 11 depicts receiver operating characteristic (ROC) curve, showing the ANN classifier performance on the 30% test data split from the training data. The ROC curve shows the false positive rate (classified as earthquake when it is a non-earthquake) on the x-axis, against true positive rate (classified as an earthquake when it is an earthquake) on the y-axis. Ideally, the curve should climb quickly toward the top-left corner indicating that the model correctly predicted the cases. The test results, are readily seen as the curve quickly attaining a true positive rate nearing 1.0, which is quite close to the ideal case.

This trained ANN classifier mechanism was tested by applying it to a dataset consisting of data that was not used in the training/validation process. This contained the last month of MyShake human activity data, and data from large United States (US) earthquakes modified to represent waveforms recorded on smartphones. Note that no selection criteria were applied to the US earthquake data (recall that for the Japan earthquake data, as stations were only selected having clearly large amplitudes). In at least one embodiment, the classifier was applied to all available waveforms, and the results of this validation are shown in Table 1 and described in the main text.

7. Network Detection Mechanism.

The first-generation network detector identified multiple triggers in a space-time cluster. Triggers were stored for a search period (e.g., 20 seconds) and the system searched for a threshold number (e.g., 4 or more) of associated triggers within a selected (e.g., 10 km) radius region. It was required that greater than a threshold percentage (e.g., 60%) of operating phones to trigger within 10 km of the location of the event for an event to be declared (the estimated event location is the centroid of the locations of the triggered phones.). In this embodiment, the origin time is assumed to be that of the first phone to trigger. The magnitude is estimated based on the peak ground acceleration of the triggered phones as described.

Figure 12:
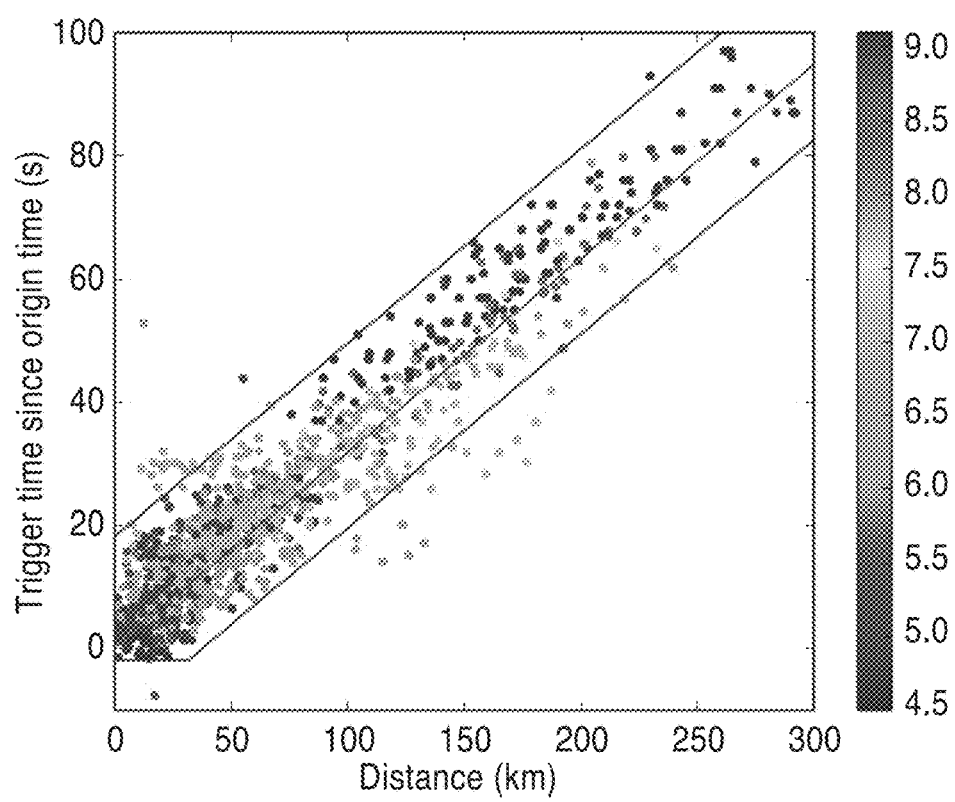
FIG. 12 is a plot of trigger time with respect to distance, showing a time-space window used for associating triggers with an event according to an embodiment of the present disclosure.

FIG. 12 depicts trigger time since origin time (t) with respect to distance from origin. Triggers from phones at greater than a threshold distance, in this case 10 km, must then fall within a defined space-time region to be associated with the event. The figure provides information on phone trigger times versus epicentral distance. The regional network data from California and Japan was modified to phone-quality data and then the disclosed classifier was applied to the data to determine when a trigger occurs. The center line is the best-fit to the data and in this case has a moveout velocity of 3.2 km/sec; with most triggers generated by the S-wave or the later surface wave. The diagonal boundary lines illustrate a time-space window used for association of triggers with an event by the network detection algorithm.

Simulated phone triggers were utilized from multiple earthquakes to test the performance of the mechanism. In the present testing the 2014 La Habra M5 earthquake and 2004 M6 Parkfield earthquake were utilized by way of example and not limitation. In these simulations zero latency was assumed due to processing and network transmission. The actual latency that will be introduced into the system due to the processing on the phone and network transmission was estimated. First, to estimate the processing delay of the ANN on the phone a test run was performed over a period of time, in this case for one night, and it was found that the average processing time was 4.5 milliseconds. Second, the transmission of the trigger data from phone to CPC was sent via UDP (User Datagram Protocol), which is a common choice for time-sensitive applications. It was found that the average delay time of transmitting the data from the phone to the CPC via UDP is 50 milliseconds.

In addition to the simulated phone triggers from real earthquakes, phone-triggers were generated for a simulated network to test performance sensitivities of the disclosed network detector. A 1° by 1° geographic box was selected and randomly distributed N stations within the box where N can be 100, 200, 300, 400 or 500. In the simulation randomly distributed false triggers were allowed at a rate based on the assumption that 10% of phones initially trigger due to movement every second, and then 7% are classified erroneously as an earthquake, to which earthquake triggers were then added.

The trigger time for each phone is based on FIG. 12. Given the distance of the phone from the epicenter, the trigger time is randomly selected within the time range given by the diagonal boundary lines seen in the figure. To determine a probability that a phone triggers, a simple regression relation was developed for the probability of a trigger given the estimated peak ground acceleration (PGA) at the site. Peak ground acceleration was estimated at the site using a standard ground motion prediction equation. Our observations from the M5.1 La Habra earthquake indicated that the probability a phone triggers is 1, 0.8, 0.4, 0.25, 0.1, 0.01 at epicentral distances up to 5, 10, 20, 30, 40, and 50 km respectively. Using these observations a simple regression is performed between $\log_{10}$PGA and trigger probability. The resulting regression relation is $$P=0.798\times\log_{10}(PGA)-0.557$$

where P is the probability that a phone is triggered. In the case that P>1 then P is set to one (P=1) and for P<0 then P is set to zero (P=0).

In 1000 simulations for each value of N, there were no false network earthquake detections. For N=500, 400 or 300 the performance is similar with all events detected about 3.5 seconds after the origin time with location errors of approximately 4 km. For N=200, 32 of the 1000 events were not detected, and eleven were not detected for N=100 (Table 4). It also took longer to detect the events, and the locations had larger errors for N=100 and 200 illustrating the preference for a dense distribution of smartphone detectors for this approach to provide high accuracy. The N=300 case corresponds to average distance between phones of 6.4 km. Also 1000 simulations were performed with only noise data without earthquakes, and it was found that the algorithm did not issue any false alerts. This elimination of false alerts is primarily a result of the threshold requirement, which in this example is that over 60% of active phones trigger within a 10 km radius for an earthquake to be declared.

8. Estimate Warning Time For Katmandu, Nepal.

For the M7.8, 25 Apr. 2015 earthquake in Nepal we can estimate the possible warning time that could have been provided in Katmandu using the disclosed smartphone seismic network approach. The location of the epicenter is 28.147° N, 84.708° E, and the location of Katmandu is 27.700° N, 85.333° E, a separation of 79 km. The S phase of the earthquake will arrive at Katmandu in 25.2 seconds based on iasp91 model. Assuming there are smartphones near the location of the earthquake, and because the disclosed network detection method in the exemplified embodiment makes use of phones within 10 km of the epicenter, it would be expected that the earthquake would have been detected when the S-wave reached 10 km from the epicenter, which is 3.9 seconds after the origin time based on iasp91. Therefore, it appears there could have been approximately 20 seconds warning if a smartphone seismic network had been established in Nepal at that time.

An Artificial Neural Network (ANN) was depicted in the example embodiment, for discerning earthquakes from human motions, based on inputs of multiple parameters obtained from the mobile devices. In the example three parameters were selected being IQR, ZC and CAV. It will be appreciated that other neural network topologies, layer configurations, and parameter selections can be utilized in the present disclosure without departing from the teachings herein. In addition, it should be appreciated that an artificial neural network (ANN) is one that is simulated with computer programming, rather than utilizing dedicated hardware for each neuron and neural connection. In addition, alternative pattern recognition can be performed with programming which operates outside of the neural paradigm, such as in response to artificial intelligence, mathematical optimizations, heuristic techniques, alternative discernment mechanisms, or combinations thereof. The computer and memory devices were not depicted in the diagrams for these alternatives for the sake of simplicity of illustration, as one of ordinary skill in the art recognizes the use of computer devices for carrying out steps involved with discernment and pattern recognition. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for detecting an earthquake, comprising: (a) earthquake early warning application programming as instructions executable on a computer processor in a cell phone; (b) a non-transitory computer-readable memory in the cell phone storing instructions executable by the computer processor; (c) wherein said instructions, when executed by the computer processor, perform steps comprising: (c)(i) acquiring accelerometer data from an accelerometer located on said cell phone; (c)(ii) comparing acquired accelerometer data against a classifier developed from previously acquired training data; (c)(iii) determining if an acceleration event registered by the accelerometer of said cell phone classifies as an earthquake event based on the classifier comparison; and (c)(iv) communicating an earthquake event through a cell phone network to a server which verifies that an earthquake is taking place based on receiving sufficient earthquake event communications from a plurality of cell phones in a sufficiently close vicinity and time to be considered a true earthquake event, and generating an earthquake early warning on cell phones in the vicinity of this earthquake.

2. The apparatus of any preceding embodiment, wherein said instructions when executed by the computer processor further comprise executing said earthquake early warning application in a background mode for continuously monitoring acceleration registered on said cell phone and processing these accelerations to discern human activities from possible earthquake events.

3. The apparatus of any preceding embodiment, wherein said instructions when executed by the computer processor further comprise recording shaking from the accelerometer of said cell phone in the frequency range of from approximately 1 Hz to 10 Hz.

4. The apparatus of any preceding embodiment, wherein said instructions when executed by the computer processor further comprise steps of distinguishing between earthquake and non-earthquake data using one or more feature selections selected from the group of feature selections consisting of: (i) interquartile range (IQR) between 25th and 75th percentile of acceleration vector sum, (ii) zero crossing rate from a component with the highest value (ZC), and (iii) cumulative absolute velocity (CAV) of acceleration vector sum.

5. The apparatus of any preceding embodiment, wherein said instructions when executed by the computer processor comprise performing steps of distinguishing between earthquake and non-earthquake data on an artificial neural network (ANN) for separating earthquake activity from human activity.

6. The apparatus of any preceding embodiment, wherein said instructions when executed by the computer processor further comprise performing steps for acquiring data from a global positioning device on said cell phone to improve classifying whether an event classifies as an earthquake event and to provide additional data about that earthquake event.

7. The apparatus of any preceding embodiment, wherein said instructions when executed by the computer processor of the cell phone further comprises considering recorded accelerometer amplitudes from a cell phone as a lower bound on actual acceleration amplitude values when performing comparing the acquired accelerometer data against a classifier developed from previously acquired training data to determine if an event classifies as an earthquake event.

8. The apparatus of any preceding embodiment, wherein said instructions when executed by the computer processor of the cell phone further comprise generating audio, visual, and/or tactile annunciations on said cell phone for announcing said earthquake early warning.

9. The apparatus of any preceding embodiment, wherein said server is configured for real time estimating of origin and magnitude of an earthquake based on processing said earthquake event communications from the plurality of cell phones in the sufficiently close vicinity and time.

10. The apparatus of any preceding embodiment, wherein said server is configured for real time estimating of shaking intensity and remaining time until damaging waves arrive at a target location, and generating associated earthquake early warnings to a target location.

11. The apparatus of any preceding embodiment, wherein said apparatus operates in conjunction with traditional seismic networks to improve generation of earthquake early warnings (EEWs).

12. An apparatus for detecting earthquakes, comprising: (a) a server computer configured for receiving data from a plurality of cell phones through wireless communication; (b) wherein each of said plurality of cell phones is configured for detecting and validating an earthquake event in response to acquiring accelerometer data, comparing it against a classifier developed from previously acquired training data to determine if an event classifies as an earthquake, and communicating events classified as earthquakes, as earthquake events, to said server computer; and (c) a non-transitory computer-readable memory storing instructions executable by the server computer; (d) wherein said instructions, when executed by the computer processor of the server, perform steps comprising: (d)(i) receiving calls from said cell phones and extracting data from earthquake events communicated to said server; (d)(ii) confirming that an earthquake is underway in response to receiving a plurality earthquake events from cell phones in a given area at a given time; (d)(iii) estimating earthquake origin and magnitude from information received in said plurality of earthquake events; and (d)(iv) generating earthquake early warnings, comprising generating annunciations on said plurality of cell phones.

13. The apparatus of any preceding embodiment, wherein said instructions when executed by the server computer further comprises steps of acquiring data from a global positioning device on said cell phone to improve determination of origin and magnitude of an earthquake.

14. The apparatus of any preceding embodiment, wherein said server is configured for real time estimating of shaking intensity and remaining time until damaging waves arrive at a target location, and generating associated earthquake early warnings to the target location.

15. The apparatus of any preceding embodiment, wherein said apparatus operates in conjunction with traditional seismic networks to improve generation of earthquake early warnings (EEWs).

16. A method for detecting an earthquake, comprising: (a) executing an earthquake early warning application on a computer processor of a cell phone for performing steps of: (a)(i) acquiring acceleration data from an accelerometer located on the cell phone; (a)(ii) comparing the acquired acceleration data against a classifier developed from previously acquired earthquake training data; (a)(iii) determining that an acceleration event registered by the cell phone accelerometer classifies as an earthquake event based on the classifier comparison; and (a)(iv) communicating an earthquake event through a cell phone network to a server computer; (b) executing earthquake event validation on the server computer configured for receiving earthquake events from a plurality of cell phones, and performing steps comprising: (b)(i) validating that an earthquake event is taking place in response to determining that sufficient earthquake event communications have been received from the plurality of cell phones in a sufficiently close vicinity and time to be considered a true earthquake event; and (b)(ii) generating an earthquake early warning on cell phones in the vicinity of this earthquake in response to validating said earthquake event.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Performance of ANN Classifier | | | |
| --- | --- | --- | --- |
| Earthquake classification | Within 10 km | Within 20 km | Within 30 km |
| 1989 Loma Prieta M7 | 100% (2/2) | 100% (4/4) | 100% (11/11) |
| 1994 Northridge M6.7 | 100% (4/4) | 100% (19/19) | 100% (29/29) |
| 2004 Parkfield M6 | 95% (19/20) | 90% (35/39) | 86% (36/42) |

TABLE 1-continued

Performance of ANN Classifier

| 2014 Napa M6 | 100% (2/2) | 75% (6/8) | 42% (10/24) |
|---|---|---|---|
| 2014 La Habra M5.1 | 100% (13/13) | 42% (22/52) | 25% (30/120) |

| Human activity classification | non-earthquake (correct) | earthquake (false) |
|---|---|---|
| 20150201-20150228 | 93% (3562/3823) | 7% (261/3823) |

TABLE 2

Accuracy Score for ANN Classifier

| | 1 | 2 | 3 | 4 | 5 | 6 | 7 | 8 | 9 | 10 |
|---|---|---|---|---|---|---|---|---|---|---|
| Score | 0.9893 | 0.9830 | 0.9839 | 0.9811 | 0.9919 | 0.9919 | 0.9893 | 0.9857 | 0.9821 | 0.9966 |
| Mean | | | | | 0.986 ($\pm$0.001) | | | | | |

TABLE 3

Simulated Network Detection Performance

| Earthquake | Origin time | Event latitude | Event longitude | Alert time | Mag. | Location error (km) | Origin time error (sec) |
|---|---|---|---|---|---|---|---|
| La Habra: True | Mar. 29, 2014 04:09:42 | 33.932 | −117.917 | | 5.1 | 3.76 | 2 |
| La Habra: Estimated | 04:09:44 | 33.900 | −117.930 | 04:09:47 | 5.2 | | |
| Parkfield: True | Sep. 28, 2004 17:15:24 | 35.815 | −120.374 | | 6.0 | 1.55 | 2 |
| Parkfield: Estimated | 17:15:26 | 35.810 | −120.390 | 17:15:28 | 5.5 | | |

TABLE 4

Simulated Network Performance for Various Phone Densities

| Number of stations | Location error (km) | Origin time error (sec) | Detection time after true origin (sec) | Events not detected (out of 1000) |
|---|---|---|---|---|
| N = 100 | 14.02 ± 8.92 | 4.41 ± 2.80 | 6.59 ± 2.87 | 11 |
| N = 200 | 5.29 ± 4.42 | 1.77 ± 0.96 | 3.93 ± 0.99 | 32 |
| N = 300 | 4.36 ± 4.79 | 1.42 ± 0.77 | 3.53 ± 0.80 | 0 |
| N = 400 | 3.56 ± 3.18 | 1.27 ± 0.66 | 3.48 ± 0.69 | 0 |
| N = 500 | 3.50 ± 3.86 | 1.26 ± 0.73 | 3.51 ± 0.63 | 0 |

What is claimed is:

1. An apparatus for detecting an earthquake, comprising:
(a) earthquake early warning application programming as instructions executable on a computer processor in a cell phone;
(b) a non-transitory computer-readable memory in the cell phone storing instructions executable by the computer processor;
(c) wherein said instructions, when executed by the computer processor, perform steps comprising:
(i) acquiring accelerometer data from an accelerometer located on said cell phone when executing said earthquake early warning application programming in a background mode for continuously monitoring acceleration registered on said cell phone and processing these accelerations to discern human activities from possible earthquake events;
(ii) comparing acquired accelerometer data on said cell phone against a classifier developed from previously acquired training data;
(iii) determining on said cell phone if an acceleration event registered by the accelerometer of said cell phone classifies as an earthquake event based on the classifier comparison; and
(iv) communicating an earthquake event from said cell phone through a cell phone network to a server which verifies that an earthquake is taking place based on receiving sufficient earthquake event communications from a plurality of cell phones in a sufficiently close vicinity and time to be considered a true earthquake event, and generating an earthquake early warning on cell phones in the vicinity of this earthquake.

2. The apparatus as recited in claim 1, wherein said instructions when executed by the computer processor further comprise recording shaking from the accelerometer of said cell phone in the frequency range of from approximately 1 Hz to 10 Hz.

3. The apparatus as recited in claim 1, wherein said instructions when executed by the computer processor further comprise steps of distinguishing between earthquake and non-earthquake data using one or more feature selections selected from the group of feature selections consisting of: (i) interquartile range (IQR) between 25th and 75th percentile of acceleration vector sum, (ii) zero crossing rate from a component with the highest value (ZC), and (iii) cumulative absolute velocity (CAV) of acceleration vector sum.

4. The apparatus as recited in claim 1, wherein said instructions when executed by the computer processor comprise performing steps of distinguishing between earthquake and non-earthquake data on an artificial neural network (ANN) for separating earthquake activity from human activity.

5. The apparatus as recited in claim 1, wherein said instructions when executed by the computer processor further comprise performing steps for acquiring data from a global positioning device on said cell phone to improve classifying whether an event classifies as an earthquake event and to provide additional data about that earthquake event.

6. The apparatus as recited in claim 1, wherein said instructions when executed by the computer processor of the cell phone further comprises considering recorded accelerometer amplitudes from a cell phone as a lower bound on actual acceleration amplitude values when performing comparing the acquired accelerometer data against a classifier developed from previously acquired training data to determine if an event classifies as an earthquake event.

7. The apparatus as recited in claim 1, wherein said instructions when executed by the computer processor of the cell phone further comprise generating audio, visual, and/or tactile annunciations on said cell phone for announcing said earthquake early warning.

8. The apparatus as recited in claim 1, wherein said server is configured for real time estimating of origin and magnitude of an earthquake based on processing said earthquake event communications from the plurality of cell phones in the sufficiently close vicinity and time.

9. The apparatus as recited in claim 8, wherein said server is configured for real time estimating of shaking intensity and remaining time until damaging waves arrive at a target location, and generating associated earthquake early warnings to a target location.

10. The apparatus as recited in claim 1, wherein said apparatus operates in conjunction with traditional seismic networks to improve generation of earthquake early warnings (EEWs).

11. An apparatus for detecting earthquakes, comprising:
(a) a server computer configured for receiving data from a plurality of cell phones through wireless communication;
(b) wherein each of said plurality of cell phones is configured for detecting and validating an earthquake event in response to acquiring accelerometer data, processing these accelerations to discern human activities from possible earthquake events and comparing it against a classifier developed from previously acquired training data to determine if an event classifies as an earthquake, and communicating events classified as earthquakes, as earthquake events, to said server computer; and
(c) a non-transitory computer-readable memory storing instructions executable by the server computer;
(d) wherein said instructions, when executed by the server computer, perform steps comprising:
(i) receiving calls from said cell phones and extracting data from earthquake events communicated to said server computer;
(ii) confirming that an earthquake is underway in response to receiving a plurality of earthquake events from cell phones in a given area at a given time;
(iii) estimating earthquake origin and magnitude from information received in said plurality of earthquake events; and
(iv) generating earthquake early warnings, comprising generating annunciations on said plurality of cell phones providing an estimate of shaking intensity and time until shaking at a users' target location, based on an estimated event epicenter, origin time and magnitude, users' location, S-wave travel time curves and ground motion prediction equations.

12. The apparatus as recited in claim 11, wherein said instructions when executed by the server computer further comprises steps of acquiring data from a global positioning device on said cell phone to improve determination of origin and magnitude of an earthquake.

13. The apparatus as recited in claim 11, wherein said server is configured for real time estimating of shaking intensity and remaining time until damaging waves arrive at a target location, and generating associated earthquake early warnings to the target location.

14. The apparatus as recited in claim 11, wherein said apparatus operates in conjunction with traditional seismic networks to improve generation of earthquake early warnings (EEWs).

15. A method for detecting an earthquake, comprising:
(a) executing an earthquake early warning application on a computer processor of a cell phone for performing steps of:
(i) acquiring acceleration data from an accelerometer located on the cell phone when executing said earthquake early warning application programming in a background mode for continuously monitoring acceleration registered on said cell phone and processing these accelerations to discern human activities from possible earthquake events;
(ii) comparing the acquired acceleration data on the cell phone against a classifier developed from previously acquired earthquake training data;
(iii) determining on the cell phone that an acceleration event registered by the cell phone accelerometer classifies as an earthquake event based on the classifier comparison; and
(iv) communicating an earthquake event from the cell phone through a cell phone network to a server computer;
(b) executing earthquake event validation on the server computer configured for receiving earthquake events from a plurality of cell phones, and performing steps comprising:
(i) validating that an earthquake event is taking place in response to determining that sufficient earthquake event communications have been received from the plurality of cell phones in a sufficiently close vicinity and time to be considered a true earthquake event; and
(ii) generating an earthquake early warning on cell phones in the vicinity of this earthquake in response to validating said earthquake event.

* * * * *